US008868238B1

(12) United States Patent
Gray et al.

(10) Patent No.: US 8,868,238 B1
(45) Date of Patent: Oct. 21, 2014

(54) APPARATUS AND METHOD FOR SYSTEMATIC CONTROL OF ROBOTIC DEPLOYMENT AND EXTRACTION

(71) Applicants: Jeremy P. Gray, Southfield, MI (US); James R. Mason, Livonia, MI (US); Michael S. Patterson, Macomb, MI (US); Matthew W. Skalny, Shelby Township, MI (US)

(72) Inventors: Jeremy P. Gray, Southfield, MI (US); James R. Mason, Livonia, MI (US); Michael S. Patterson, Macomb, MI (US); Matthew W. Skalny, Shelby Township, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 80 days.

(21) Appl. No.: 13/738,791

(22) Filed: Jan. 10, 2013

(51) Int. Cl.
*G05B 19/00* (2006.01)
*G05D 1/12* (2006.01)
*G05B 19/02* (2006.01)
*G05D 1/02* (2006.01)

(52) U.S. Cl.
CPC .......... *G05B 19/02* (2013.01); *Y10S 901/01* (2013.01); *G05D 1/0225* (2013.01); *G05D 2201/0209* (2013.01)
USPC ............................................. 700/258; 901/1

(58) Field of Classification Search
USPC .............. 701/2, 23; 901/1, 50; 700/248, 249, 700/250, 258, 259
See application file for complete search history.

(56) References Cited

U.S. PATENT DOCUMENTS

| | | | |
|---|---|---|---|
| 6,728,598 B2 | 4/2004 | Fujita et al. | |
| 7,069,111 B2 | 6/2006 | Glenn et al. | |
| 7,348,747 B1* | 3/2008 | Theobold et al. | 318/568.21 |
| 7,454,469 B2 | 11/2008 | Zhou et al. | |
| 7,720,572 B2* | 5/2010 | Ziegler et al. | 700/245 |
| 7,870,112 B2 | 1/2011 | Karun et al. | |
| 7,957,850 B2* | 6/2011 | Anderson | 701/2 |
| 8,078,338 B2 | 12/2011 | Pack et al. | |
| 2004/0158355 A1 | 8/2004 | Holmqvist et al. | |
| 2004/0168837 A1 | 9/2004 | Michaud et al. | |
| 2007/0080863 A1* | 4/2007 | Glockler et al. | 342/463 |
| 2008/0027590 A1* | 1/2008 | Phillips et al. | 701/2 |
| 2011/0106339 A1* | 5/2011 | Phillips et al. | 701/2 |
| 2012/0185090 A1 | 7/2012 | Sanchez et al. | |
| 2014/0150806 A1* | 6/2014 | Hu et al. | 128/870 |

* cited by examiner

*Primary Examiner* — Jason Holloway
(74) *Attorney, Agent, or Firm* — David L. Kuhn; Thomas W. Saur; Luis Miguel Acosta

(57) ABSTRACT

A system control apparatus and method for systematic control of (i) extraction of a vehicle from an environment, (ii) stowage of the vehicle in a modular handling and stowage system, the system having a primary module and zero or more secondary modules, wherein the secondary modules are serially, mechanically coupled to the primary module and together, and (iii) deployment of the vehicle from the module group in response to command signals, sensor signals, and status signals.

22 Claims, 11 Drawing Sheets

APPARATUS AND METHOD FOR SYSTEMATIC CONTROL OF ROBOTIC DEPLOYMENT AND EXTRACTION

GOVERNMENT INTEREST

The invention described herein may be manufactured, used, and licensed by or for the U.S. Government for Governmental purposes without payment of any royalties thereon.

CROSS-REFERENCE TO RELATED APPLICATIONS

This application is related to U.S. application Ser. No. 13/737,693, filed Jan. 9, 2013, by Gray, et al., titled, "System and method for vehicle deployment, extraction, and stowage", which is incorporated by reference in its entirety.

BACKGROUND OF THE INVENTION

1. Field of the Invention

The present invention generally relates to an apparatus and method for systematic control of robotic deployment and extraction.

2. Background Art

Conventional systematic robotic control apparatus and methods include the subject matter disclosed in U.S. Pat. No. 7,957,850, by Anderson, filed Aug. 19, 2009, titled "Mobile station for unmanned vehicle".

Such conventional apparatus and methods may have deficiencies such as they are generally specialized for particular applications and, thus, may not be appropriate for the implementation desired, require extensive human interaction, have limited flexibility, and/or fail to provide efficient modes of operation. As such, conventional apparatus and methods may be unsuitable for many desired unmanned ground vehicle applications.

Thus, there exists a need and an opportunity for an improved apparatus and method for systematic control of robotic deployment and extraction. Such an improved apparatus and method may overcome one or more of the deficiencies of the conventional approaches.

SUMMARY OF THE INVENTION

The present invention is directed to an apparatus and method for systematic control of robotic (e.g., unmanned ground vehicles such as a small, tracked robots) deployment and extraction that may advantageously implemented in connection with a robot deployment, extraction and stowage module group. The module group that is implemented in connection with the apparatus and method for systematic control of robotic deployment and extraction is a modular system.

The module group comprises at least one primary, full-function module and may include one or more secondary, limited-function modules. The primary module and all of the secondary modules that may be implemented together as the module group are generally electrically and mechanically coupled. Each of the secondary modules may be added or removed to grow the module group to provide multiple unmanned ground vehicle deployment, extraction, and stowage.

In the preferred embodiment, based on the interface chosen for module to module communication, and voltage drops limitations through, for example, Ethernet and Universal Serial Bus (USB) total networks, the maximum size that is recommended for the module group is twenty modules. However, other embodiments may provide more additional module implementation beyond twenty. As understood by one of skill in the art, the present invention is generally scalable such that other vehicles and apparatuses may be deployed, extracted, and stowed in accordance with the present invention.

Each modular unit of the module group is marsupial; that is, each module provides containerized stowage of the desired conventional small, tracked unmanned ground vehicle (e.g., UGV, robot, or the like) as well as electro-mechanical elements to provide loading, unloading, and tilting of the robot. That is, each unit contains a UGV and enables remote extraction and deployment. In one embodiment, the modular units may be mounted to a host. When multiple modules are implemented, one or more of the modules may contain a vehicle, or, alternatively, remain empty. When implemented, the host can be a manned or unmanned vehicle, container, wagon, trailer, cargo hold, air craft, water craft, or the like, which may provide air, water, or ground deliverability to a desired location (e.g., field of action).

The module group comprises one master (e.g., primary, load/unload/store, end, full-function, etc.) module (e.g., unit, container, box, etc.); and may further include any number of slave (e.g., secondary, limited-function, etc.) modules. Each of the primary module and the secondary modules generally provides storage for a UGV as each module comprises stowage mechanics, a motor controller, embedded software, a UGV alignment sub-system, robotic positioning sensors, status indicators (e.g., light emitting diodes (LEDs)), an electro-mechanical UGV power on/off mechanism (implemented to conserve UGV battery charge) that is generally remotely activated, a mechanical grasp mechanism to hold and clench and rotate the robot in place and position, and a linear actuator.

Each of the primary and secondary modules includes the capability to position, rotate, and stow the respective robot in a substantially vertical orientation thereby generally reducing or minimizing the horizontal storage space (otherwise known as the footprint) that is implemented to stow the robot(s), and potentially maximizing the number of robots that can be carried via the host or otherwise stowed.

Each adjacent module of the module group interlinks via mechanical coupling and electrical coupling. The robot(s) exit and enter the module group from a common point, that is, the master (primary) module.

The mechanical coupling between adjacent modules may be implemented as draw latches that use a compressive force interlocking system. Each module is generally interconnected to the adjacent modules by using bullet/hole alignment devices in combination with the draw latches.

The module group comprises a master module, and zero or more slave modules. The master module includes a UGV robot master support tray and lift (articulation) actuator that generally provides a primary ingress and egress ramp for all of the robots that are serially stored in the master and the slave modules. That is, the module group provides "last in, first out" (LIFO) stowage of the robots. Each slave module contains a UGV robot limited-function support tray, which when lowered, provides overlap into the adjacent module for interconnecting the continuous ingress and egress path for the robots to traverse upon throughout the system of interconnected (coupled) modules.

The systematic control apparatus comprises a single system master controller, which communicates to (i) a host interface system when the host is implemented, (ii) the master module controller, and (iii) slave module controllers. Each of the individual master and slave modules includes an individual motor controller which is configured, when in slave mode, to the system master controller. The slave controller in the master module and each of the slave modules are linked (electrically coupled) to the system master controller through a serial communications link. The master module and each slave module also comprise a clamping linear drive actuator and location sensors. The slave controller in the master module and in each of the slave modules is connected (coupled) to provide control of the respective clamping linear drive actuator. The clamping linear drive actuators are generally connected mechanically to a main drive shaft via a linkage such that the clamping linear drive actuator rotates a main drive shaft.

The system master controller generally: (i) interfaces (typically via a wireless link) with (a) a user (e.g., operator, Soldier, etc.), and (b) the host interface system when implemented; (ii) monitors and controls the status of the individual master and slave modules; (iii) provides hierarchy control over the master and slave modules; (iv) provides data for the graphical user interface; and (v) distributes the power and serial communication to each of the slave modules and master module motor controller. The system master controller monitor and control of the status of the individual master and slave modules includes executing extraction or deployment commands or operation; and also may include real time information such as the presence of a robot within each module, and whether each module is in the operation of robot extraction or deployment.

The system master controller may also provide an interlock lockout failsafe feature to each module when the user does not provide the correct information to execute a command. For example, a slave module located three modules away from the master module will not be allowed to execute a robot deploy command when the prior two modules are not in the deployed position, or when a robot is present in the one or both of the modules located one or two modules away from the master module has not yet deployed the respective robot or when the robot contained within the module commanded to deploy has not established a communication link.

The software architecture that is implemented in the system master controller provides startup and run-time sequence routines and definitions for the states that are employed. The software architecture that is implemented in the system master controller also provides a specialized rule set for determining module states.

Module state determination is performed on the multiple modules in the module group. The software architecture that is implemented in the system master controller also provides a specialized state diagram for the individual motor controllers of each of the module in the module group.

The individual motor controllers include H-bridge motor drivers that amplify actuator signals from the microcontroller in the individual motor controllers. The supporting circuitry in the individual motor controllers is used as an interface to the microcontroller.

A main loop procedure (software routine) in the microcontroller runs a state machine that is implemented in the microcontroller. In the stow state, a solenoid assembly in the module can be actuated to change the power state (e.g., on/off) of the robot. The individual motor controller microcontroller tracks (monitors) the operations of the solenoid assembly to ensure that a violation of the cycle time does not occur. In the deploy state, the individual motor controller uses the actuator(s) to lower the tray of the module to the deployed position or pose. The individual motor controller also checks to ensure the deployment is proper, for example through the use of optical sensors, to raise or lower the support tray, or proceed with other operations.

Two main operations can occur in the deployed state. When there is no robot on the tray, a Society of Automotive Engineers (SAE) Joint Architecture for Unmanned Systems (JAUS) component may invoke the robot loading procedure. Secondly, the module may be stowed with or without a robot. When the individual motor controller is requested by the JAUS component to load a robot, the state machine transitions to the Receive Robot state that is located within the Deployed state.

When the module has a fault or error while operating (i.e., an over (excessive) current, over time (time range exceeded for a process), and the like), the module transitions to the error state in the state machine. On the transition to the error state, a control signal is sent to the H-bridge to stop the actuator(s). Then the JAUS component is informed of the error condition via the serial communication link. The cause of the error is noted and binned into one of four categories. While in the error state the red and green indicator LEDs of the module work together to flash the binary code corresponding to the error category of the module. The green and red flashing LEDs indicate an error state to the operator.

The above features, and other features and advantages of the present invention are readily apparent from the following detailed descriptions thereof when taken in connection with the accompanying drawings.

DETAILED DESCRIPTION OF THE PREFERRED EMBODIMENT(S)

Definitions and Terminology

Figure 1A:
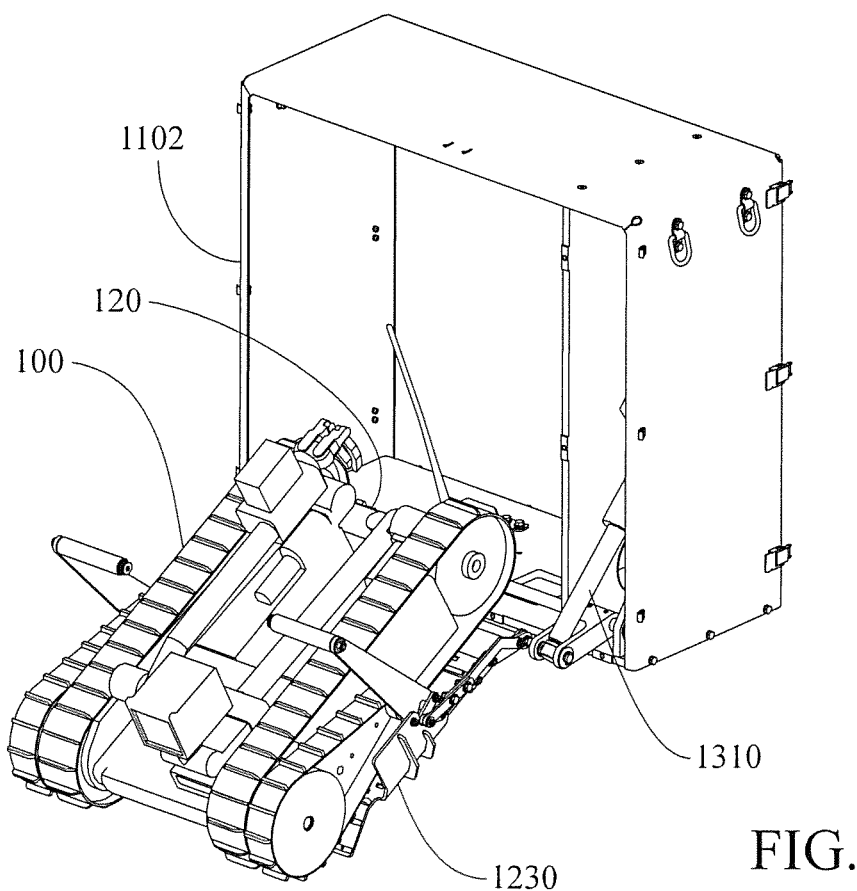
FIGS. 1(A-B) are isometric views from the upper, right, rear of a primary module and a tracked robot that may be deployed and extracted in connection with the module.

The following definitions and terminology are applied as understood by one skilled in the appropriate art.

The singular forms such as "a," "an," and "the" include plural references unless the context clearly indicates otherwise. For example, reference to "a material" includes reference to one or more of such materials, and "an element" includes reference to one or more of such elements.

As used herein, "substantial(ly)" and "about", when used in reference to a quantity or amount of a material, characteristic, parameter, and the like, refer to an amount that is sufficient to provide an effect that the material or characteristic was intended to provide as understood by one skilled in the art. The amount of variation generally depends on the specific implementation. Similarly, "substantially free of" or the like refers to the lack of an identified composition, characteristic, or property. Particularly, assemblies that are identified as being "substantially free of" are either completely absent of the characteristic, or the characteristic is present only in values which are small enough that no meaningful effect on the desired results is generated.

A plurality of items, structural elements, compositional elements, materials, subassemblies, and the like may be presented in a common list or table for convenience. However, these lists or tables should be construed as though each member of the list is individually identified as a separate and unique member. As such, no individual member of such list should be considered a de facto equivalent of any other member of the same list solely based on the presentation in a common group so specifically described.

Concentrations, values, dimensions, amounts, and other quantitative data may be presented herein in a range format. One skilled in the art will understand that such range format is used for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a size range of about 1 dimensional unit to about 100 dimensional units should be interpreted to include not only the explicitly recited limits, but also to include individual sizes such as 2 dimensional units, 3 dimensional units, 10 dimensional units, and the like; and sub-ranges such as 10 dimensional units to 50 dimensional units, 20 dimensional units to 100 dimensional units, and the like.

Controller software that is implemented in connection with the apparatus and method of the present invention is generally compliant with Society of Automotive Engineers (SAE) Joint Architecture for Unmanned Systems (JAUS) message standards (e.g., AS-4 standard AS5669A, and the like, which may be acquired at http://standards.sae.org/electrical-electronics-avionics/architecture/standards/), which are incorporated by reference in their entirety. Basic information regarding the JAUS software architecture can be found at http://www.openjaus.com/understanding-sae-jaus. In any case, one of ordinary skill in the relevant art would have a working understanding of the JAUS software architecture, protocols, messaging, and the like. Further, the controller software for the apparatus and method of the present invention is generally compliant with the Department of Defense (DoD) Robotic Systems Joint Project Office (RSJPO) Interoperability Profiles (IOPs), which profile more specific ways to use the SAE JAUS standards, and which are incorporated by reference in their entirety. The DoD RSJPO IOPs may be accessed via the Website at http://www.rsjpo.army.mil/. One of ordinary skill in the art would understand that any appropriate software architecture, protocols, messaging, and the like may be implemented to meet the design criteria of a particular implementation.

Digital logic signals (e.g., levels, states, conditions, etc.) implemented in the present invention are generally binary, i.e., one of TRUE (e.g., YES, HIGH, 1, ON, and the like) in a first state, and, alternatively in the opposite (second) state, FALSE (e.g., NO, LOW, zero, 0, OFF, and the like), would be understood by one of skill in the art. Computer software may be referred to as programming, methods, steps, blocks, state machine, routines, loops, and the like as would be understood in the context used by one of ordinary skill in the art. Elements and/or assemblies may be referred to as having states, statuses, poses, modes, conditions, and the like as would be understood in the context used by one of ordinary skill in the art.

As used herein, elements having numbers more than 100 and less than 1000 generally refer to conventional elements known by one having ordinary skill in the art, while elements number 1000 and above refer to the present invention, or elements, components, and the like thereof. Like numbered elements generally refer to the same element; however, the like numbered elements may include a suffix "L" to designate the left side element and a suffix "R" to designate the right side element when left and right elements are mirrors (i.e., physical embodiment of mirror images) of each other. Similarly, a center (i.e., substantially centrally positioned) element may be designated with the suffix "C". The suffix "x" refers to a generic member of the particular element group (e.g., an element from a group having a number of similar elements "a-n"); hence, the suffix "(x+1)" refers to a serially, immediately higher element, and the suffix "(x−1)" refers to a serially, immediately lower element. When it is understood by one of skill in the art from the context of use, suffix designation may be omitted herein.

For clarity of Figures and explanation, conventional direct ("hard") electrical wiring and related connectors are generally not illustrated. One of ordinary skill in the art would understand the layout, positioning, and operational characteristics of such conventional elements. One of ordinary skill in the art would also understand that such direct electrical wiring generally may provide multi-message, bi-directional communications as well as multi-level (e.g., different levels of voltage and/or current) electrical power.

Conventional elements further generally include: (i) those elements associated with an unmanned ground vehicle (e.g., tracked robot, and the like) that is an exemplar of the vehicle to be deployed, extracted (i.e., retrieved), and stowed (i.e., transported, stored, held, etc.) in accordance with the present invention; (ii) those elements associated with a host (not shown) vehicle, sub-system, vessel, receptacle, warehouse, or the like where the present invention may be installed (i.e., implemented, disposed, etc.); and/or (iii) programmable controller and computer hardware and memory, but not including the particular computer programming that may be implemented in accordance with the present invention.

With reference to the Figures, the preferred embodiments of the present invention will now be described in detail. The present invention may be implemented in the context of a modular handing and stowage system (e.g., module group) 1000. Generally, the present invention provides an improved apparatus (e.g., a system control apparatus 2000) and an improved method (e.g., a method, process, state machine, steps, blocks, and the like 4000) for systematic control of robotic deployment and extraction.

For purposes of description of directions, orthogonal coordinate referencing is generally assumed. Longitudinal (front/back, fore/aft, forward/backward, etc.) and lateral (left/right, side to side, etc.) directions relative to the system 1000 are generally as illustrated on FIG. 2A, and are generally perpendicular to each other. As such, vertical (i.e., up/down, upward/downward, upper/lower, top/bottom, lift/lower, etc.) directions are generally perpendicular to the longitudinal/lateral (i.e., horizontal) plane (e.g., an earth or water body plane). Similarly, clockwise (CW) and counterclockwise (CCW) rotational (or angular) motions are referenced as viewed from the right towards the left about the right-left axis.

Referring to FIGS. 1(A-B), 2(A-B), and 3-4, the modular handling and stowage system (module group) 1000 and components thereof are illustrated. The module group 1000 comprises a primary module 1102 and may, optionally, further comprise one or more secondary modules 1104 (e.g., secondary modules 1104a and 1104b, see, for example, FIGS. 2A and 4). Further, in the description below, the primary module 1102 may be referred to as Module 1, and the secondary modules 1104a and 1104b may be referred to as Module 2 and Module 3, respectively. Generically, the designation Module_x refers to either of the primary module 1102 and the secondary module 1104.

A conventional tracked robot 100 that may be deployed, extracted, and stowed in connection with the modular handling and stowage system (module group) 1000 is also shown. In a typical implementation of the modular handling and stowage system 1000, there is one UGV 100 that is associated with each module in the module group 1000. For example, as illustrated on FIG. 4: robot 100_PM and primary module 1102; robot 110a and secondary module 1104a; and, robot 100b and secondary module 1104b.

Referring in particular, to FIGS. 1(A-B), isometric views from the upper, right, rear of the primary module 1102 including the tracked robot 100 that may be deployed, extracted, and stowed in connection with the modular handling and stowage system 1000 is shown. The UGV 100 generally includes a nose 120. The primary module 1102 comprises a primary module support tray 1230, a lifting (lift) linear actuator (motor) 1310, and a clamping linear actuator (motor) 1340.

Figure 1B:
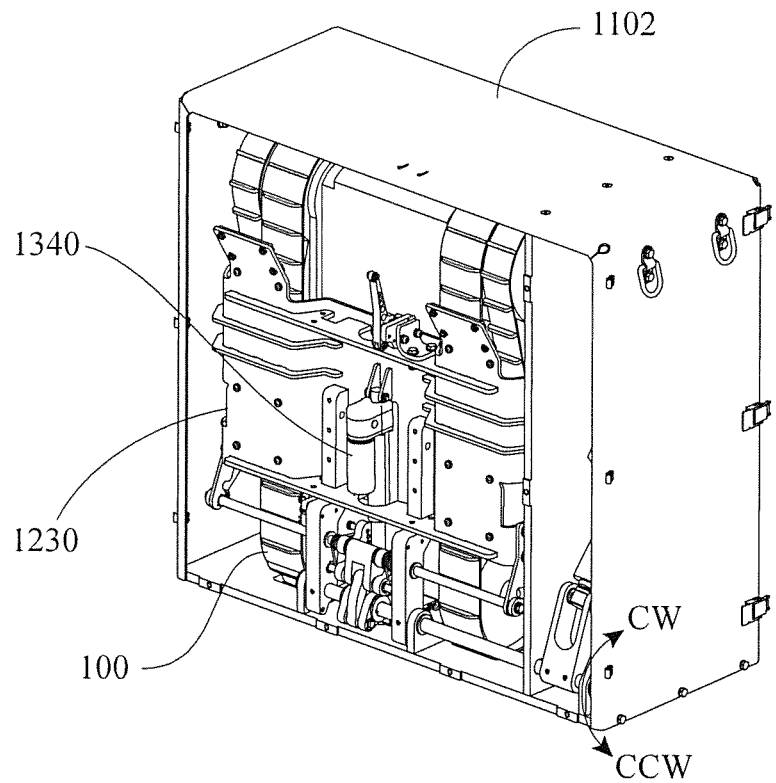

On FIG. 1A, the robot 100 is illustrated in a partially loaded (extracted)/unloaded (deployed) position on the primary module support tray 1230. On FIG. 1B, the robot 100 is illustrated in a stowed (stored), substantially vertical position. The primary support tray 1230 is rotated clockwise (CW) to the vertical (stowed) position, and counter-clockwise (CCW) to the deployed position (as illustrated on FIG. 1A) via the lifting linear actuator 1310.

As illustrated in detail in connection with FIGS. 2(A-B)-4, the primary module 1102 may be serially coupled, mechanically and electrically, to the secondary module 1104a which may in turn be daisy chained (e.g., serially coupled), mechanically and electrically, to additional secondary modules 1104 (i.e., one or more secondary modules (e.g., one or more secondary modules 1104, starting, as illustrated, with the secondary module 1104b) to form a modular handling and stowage system (e.g., module group) 1000. As described in more detail below in connection with FIGS. 6(A-B), a number of sensors and indicators are generally implemented (i.e., installed, mounted, placed, fixed, positioned, etc.) on the primary module 1102 and the secondary module 1104 to provide signals for use in connection with the apparatus and method of the present invention.

Figure 2A:
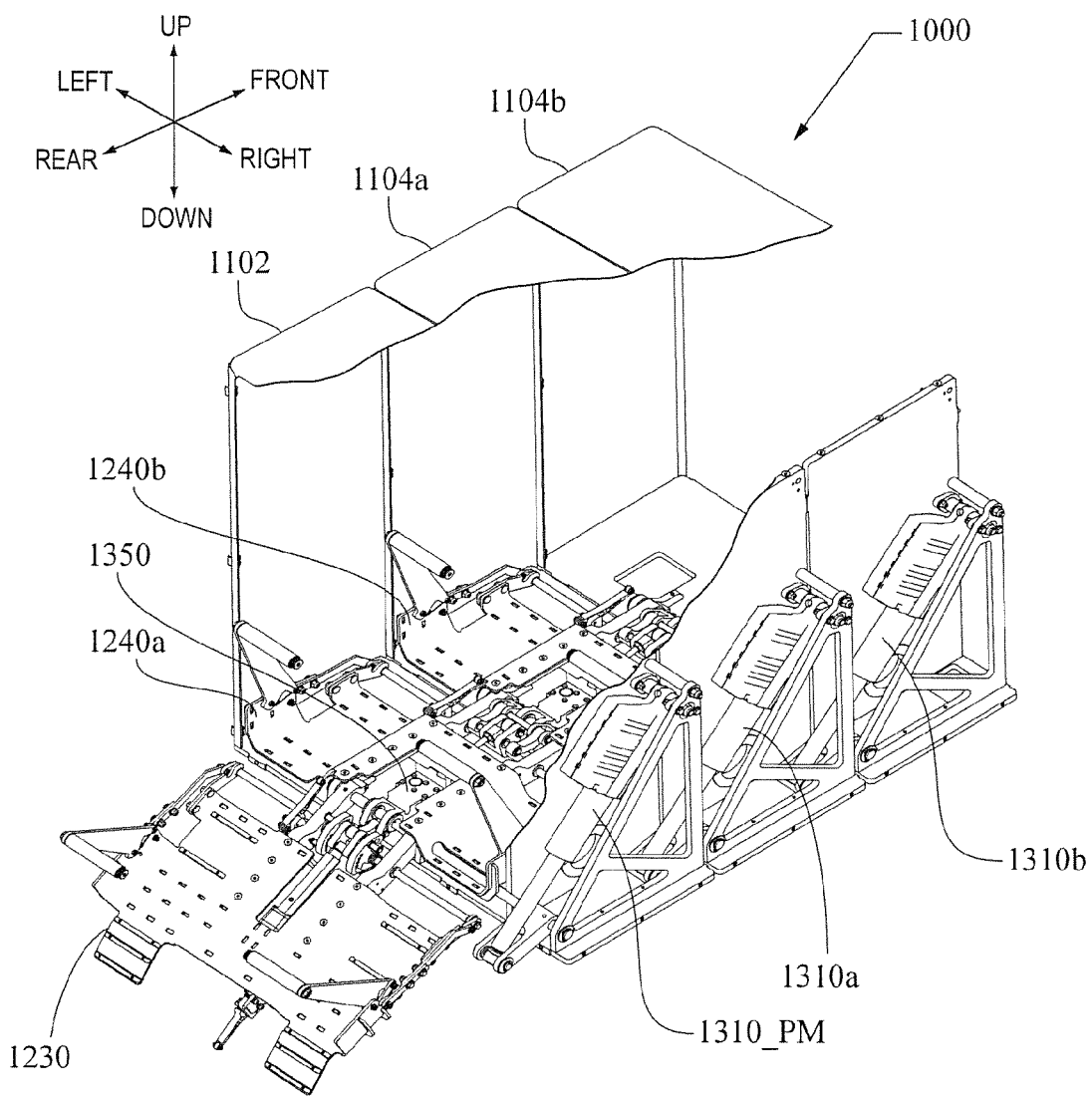
FIG. 2A is a cut-away isometric view from the upper, right, rear of a module group of the present invention comprising the primary module of FIGS. 1(A-B), and FIG. 2B a right side elevation view of a portion of the module of FIG. 2A showing alternative positions of a rotating component.

Referring to FIG. 2A, a cut-away isometric view from the upper, right, rear of the module group 1000 of the present invention comprising the primary module 1102 and a plurality of secondary modules 1104 (e.g., secondary modules 1104a-1104b) is shown. The modules are all illustrated in an empty condition. The module 1102 and the modules 1104 further comprise a clamp dog 1350. While each of the modules includes a lifting linear motor 1310 (e.g., the primary module 1102 comprises the lifting linear motor 1310_PM, the secondary module 1104a comprises the lifting linear motor 1310a, and the secondary module 1104b comprises the lifting linear motor 1310b) only the primary module 1102 includes a clamping linear motor 1340. Likewise, the secondary modules 1104 comprise a secondary support tray 1240 (e.g., a secondary support tray 1240a is included in the secondary module 1104a, and a secondary support tray 1240b is included in the secondary module 1104b). The secondary support tray 1240 is rotated between the deployed (horizontal) and stowed (vertical) positions via the lifting linear motor 1310.

Sensors and indicators that are described below in connection with FIGS. 6(A-B) are implemented to determine when the lifting linear motor 1310 is operating and the time duration of the operation, the linear position of the linear actuator, and the current draw of the actuator; and, when the clamping linear motor 1340 is operating and the time duration of the operation, the linear position of the linear actuator, and the current draw of the actuator. Sensors and indicators that are described below in connection with FIGS. 6(A-B) are implemented to determine when the primary module support tray 1230 and the secondary module support tray 1240 are in deployed and stowed (e.g., vertical) positions (e.g., the state of the module support trays 1230 and 1240, clamp dogs 1350, robots 100, etc.; hence, the state of the modules 1102 and 1104).

The primary module support tray 1230 is illustrated in the below (or sub-) horizontal (deployed) position, and the secondary module support trays 1240 are illustrated in the horizontal (deployed) position.

Figure 2B:
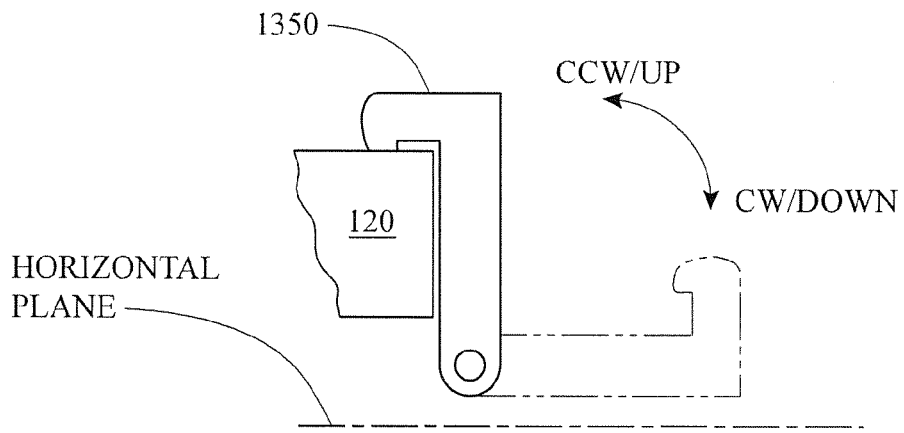
FIGS. 2(A-B)

FIG. 2B is a right side elevation view of a portion of the robot 100 and a portion of the clamp dog 1350. When the robot 100 is in a horizontal position and the nose 120 of the robot 100 is properly longitudinally positioned, the clamp dog 1350 is generally rotated counter-clockwise (CCW) to a clamping position to grasp (i.e., clamp, hold, retain, seize, etc.) the nose 120; and clockwise (CW) to release the nose 120. Sensors and indicators that are described below in connection with FIGS. 6(A-B) are implemented to determine when the nose 120 is properly positioned, and when the clamp dog 1350 is in a vertical position and when the clamp dog 1350 is in a horizontal position (e.g., rotated to substantially parallel with the horizontal plane).

Figure 3:
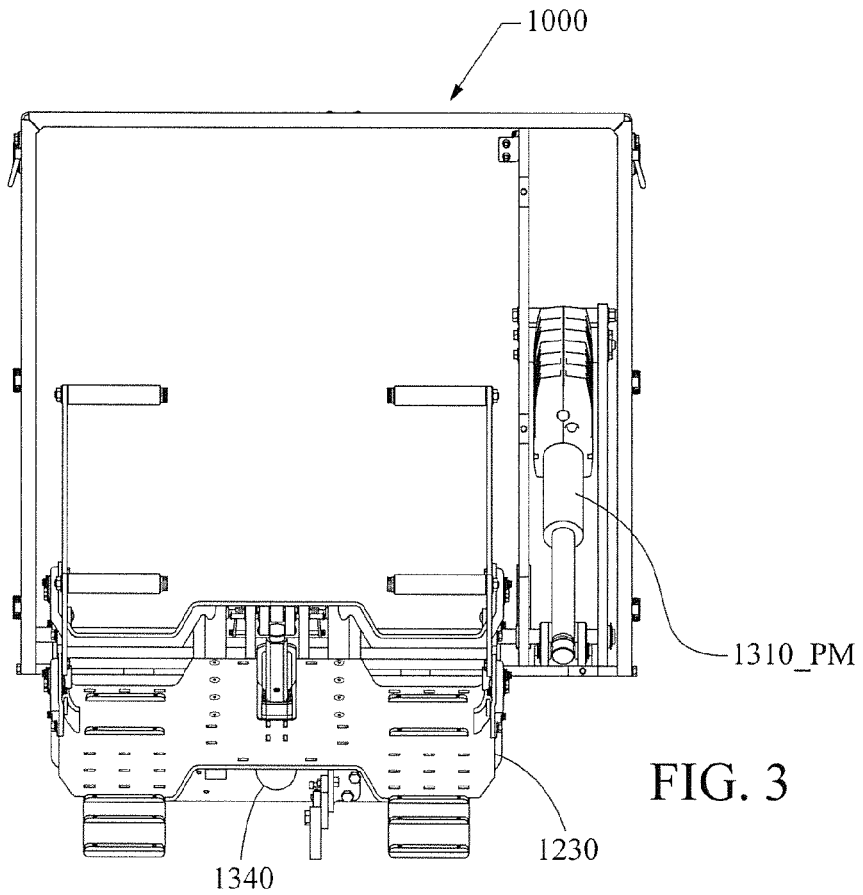
FIG. 3 is a rear elevation view of the module group of FIG. 2A.

Referring to FIG. 3, a rear elevation view of the modular handling and stowage system (module group) 1000 is shown.

Figure 4:
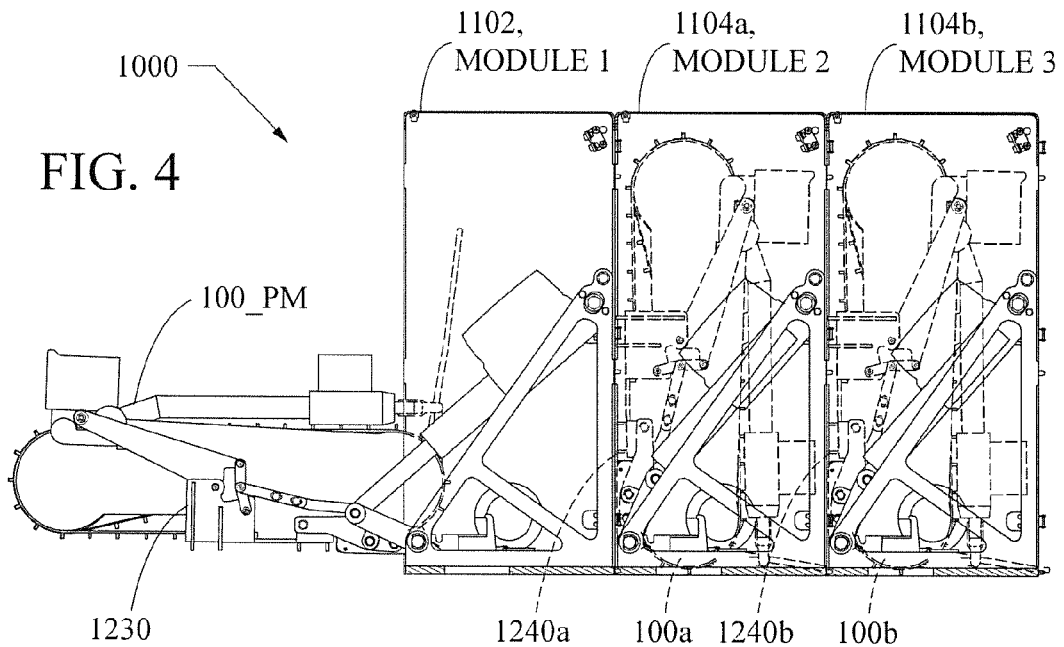
FIG. 4 is a cut-away side elevation view from the right of the module group of FIG. 2A.

Referring to FIG. 4, a side elevation cut-away view of the connected module group 1000 of FIG. 2A with module covers sectioned and some internal components in phantom for clarity of illustration, and including three robots 100 (e.g., the first robot 100_PM, the second robot 100a, and the third robot 100b) is shown. The primary module support tray 1230 is in the horizontal (deployed) position; hence, the primary module 1102 is in the "deploying" state. The secondary module support trays 1240a and 1240b are in the vertical position; hence, the secondary modules 1104a and 1104b are in the "stowed" state. Note that states that are identified by inclusion in quotes (e.g., "stowed") may also be alternatively referred to without quotes (e.g., stowed), with the first letter capitalized (e.g., Stowed), in all capital letters (e.g., STOWED), or by numerical reference element number (see, for example, on FIG. 10C, element 4106) without changing the meaning of the identified state.

Figure 5:
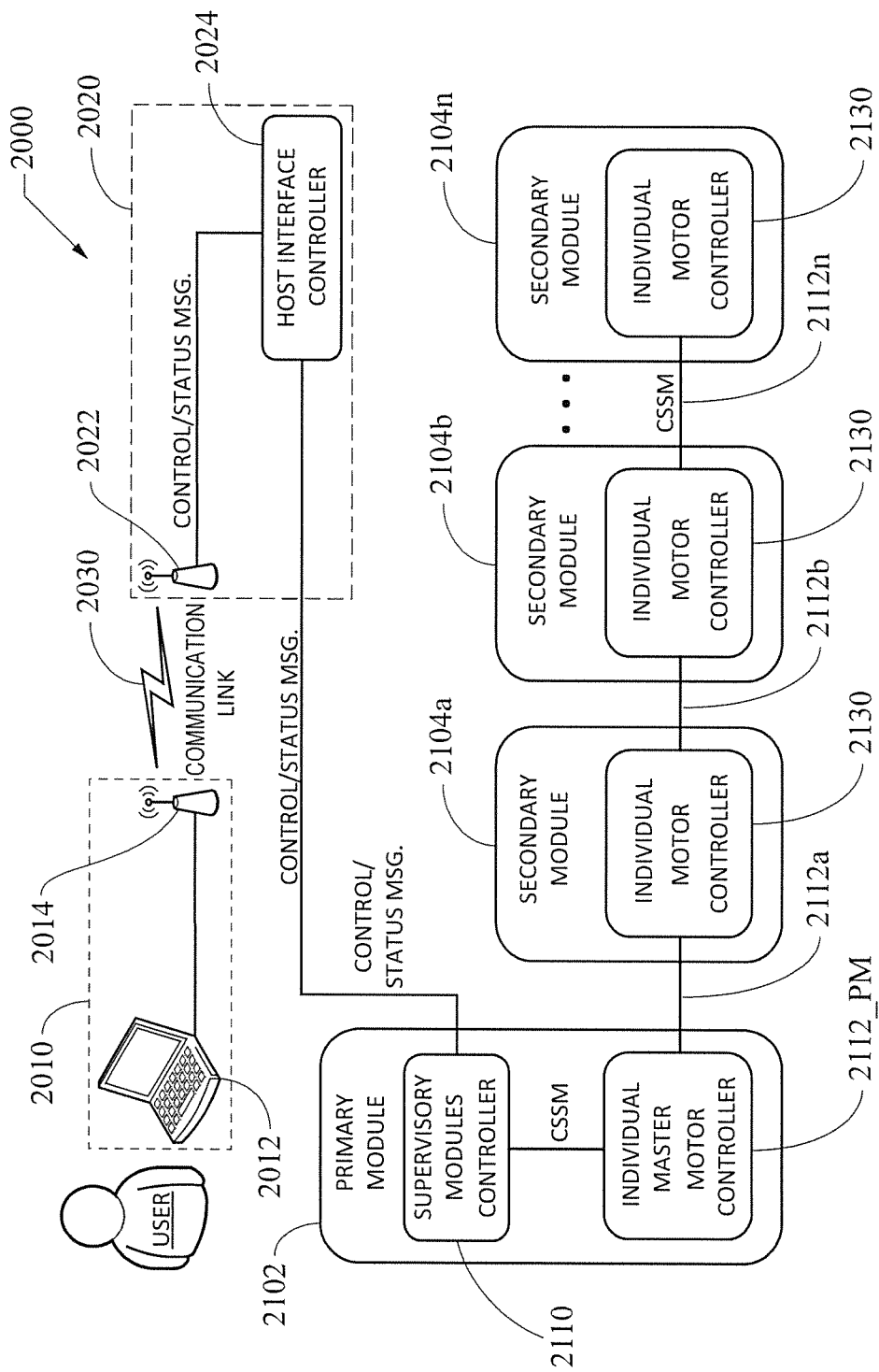
FIG. 5 is a block, electrical schematic diagram of a control apparatus of the present invention.

Referring to FIG. 5, a block electrical schematic diagram illustrating the system control (management, operation, etc.) apparatus (e.g., system controller) 2000 is shown. The system control apparatus 2000 generally monitors and controls the operation (e.g., process, steps, method, etc.) of the modular handling and stowage system 1000 as directed by a User. In one embodiment, the system control apparatus 2000 comprises an operation control sub-system 2010, a host interface system 2020, a wireless communication link 2030, and a primary module control sub-system 2102. Within (e.g., throughout) the modular handling and stowage system (module group) 1000 the system control apparatus 2000 generally manages via a plurality of signals (e.g., commands, messages, transmissions, communications, and the like) (e.g., signals Control/Status Msg or, alternatively in some uses herein, abbreviated, CSSM, to designate the same signals) that control, command, indicate status, provide sensor output, actuator input, warning, power and/or power transmission, and the like. The specific role of a given signal CSSM will be understood by one of ordinary skill in the art.

In another embodiment, e.g., when the system 1000 is implemented without the host 200, the host interface system 2020 may be omitted.

The operation control sub-system 2010 generally includes an operator control unit (OCU) 2012 by which the User monitors and controls the modular handling and stowage system 1000 (e.g., via screen images, graphical user interfaces, keyboard and/or touch-screen entry, joystick manipulation, etc.), and a first communications link transceiver 2014 that is electrically coupled (interlinked, linked, etc.) to the OCU 2012. The host interface system 2020 is generally implemented in connection with (e.g., installed on, mounted to, etc.) a host (e.g., a vehicle, trailer, etc.), and comprises a second transceiver 2022 and a host interface controller 2024 that is electrically coupled to the second transceiver 2022. The host interface controller 2024 is generally electrically coupled to the primary module control sub-system 2102. When the modular handling an stowage system 1000 is implemented without the host interface system 2020, the host interface controller 2024 is likewise generally not included.

The primary module control sub-system 2102 comprises a modules supervisory controller 2110, and an individual motor controller 2112 (e.g., a motor controller 2112_PM). The modules supervisory controller 2110 may be directly electrically coupled to the host interface controller 2024. The modules supervisory controller 2110 is generally electrically coupled to the primary motor controller 2112_PM.

The communication link 2030 generally provides a wireless, bi-directional communication path between the operation control sub-system 2010 and the host interface system 2020, and thereby, between the User and the modular handling and stowage system (module group) 1000 which is mounted on the host.

When the module group 1000 includes one or more of the secondary modules 1104, each secondary module 1104 comprises a secondary sub-system controller 2104 (e.g., secondary sub-system controllers 2104-2104*n*) that is generally operated in a so-called slave mode. The secondary sub-system controller 2104 includes an individual motor controller 2112 (e.g., motor controllers 2112*a*-2112*n*). All of the individual motor controllers 2112 are generally serially electrically coupled (e.g., via a serial communications link 2130) such that the primary module modules supervisory controller 2110, which is generally operated in a so-called master mode, provides communication (e.g., monitor and control of operations via signals, Control/Status Msg or CSSM) to all of the modules 1102 and/or 1104. As such, monitor and control operations of the modular handling and stowage system (module group) 1000 are provided to and from the User via the system control apparatus 2000.

Figure 6A:
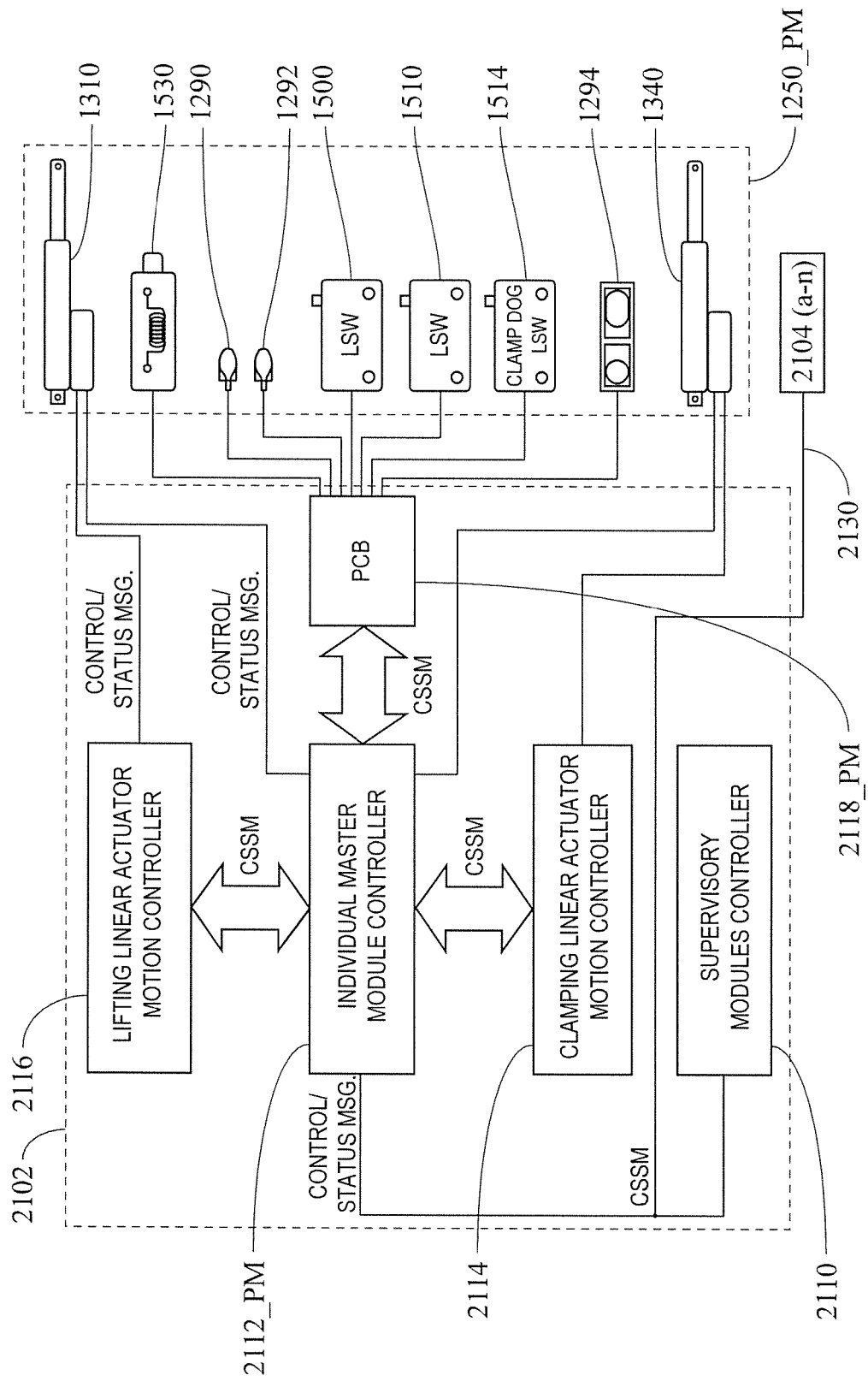
FIGS. 6(A-B) are block, electrical schematic diagrams of a primary and a secondary module controller, respectively, of FIG. 5.
Figure 6B:
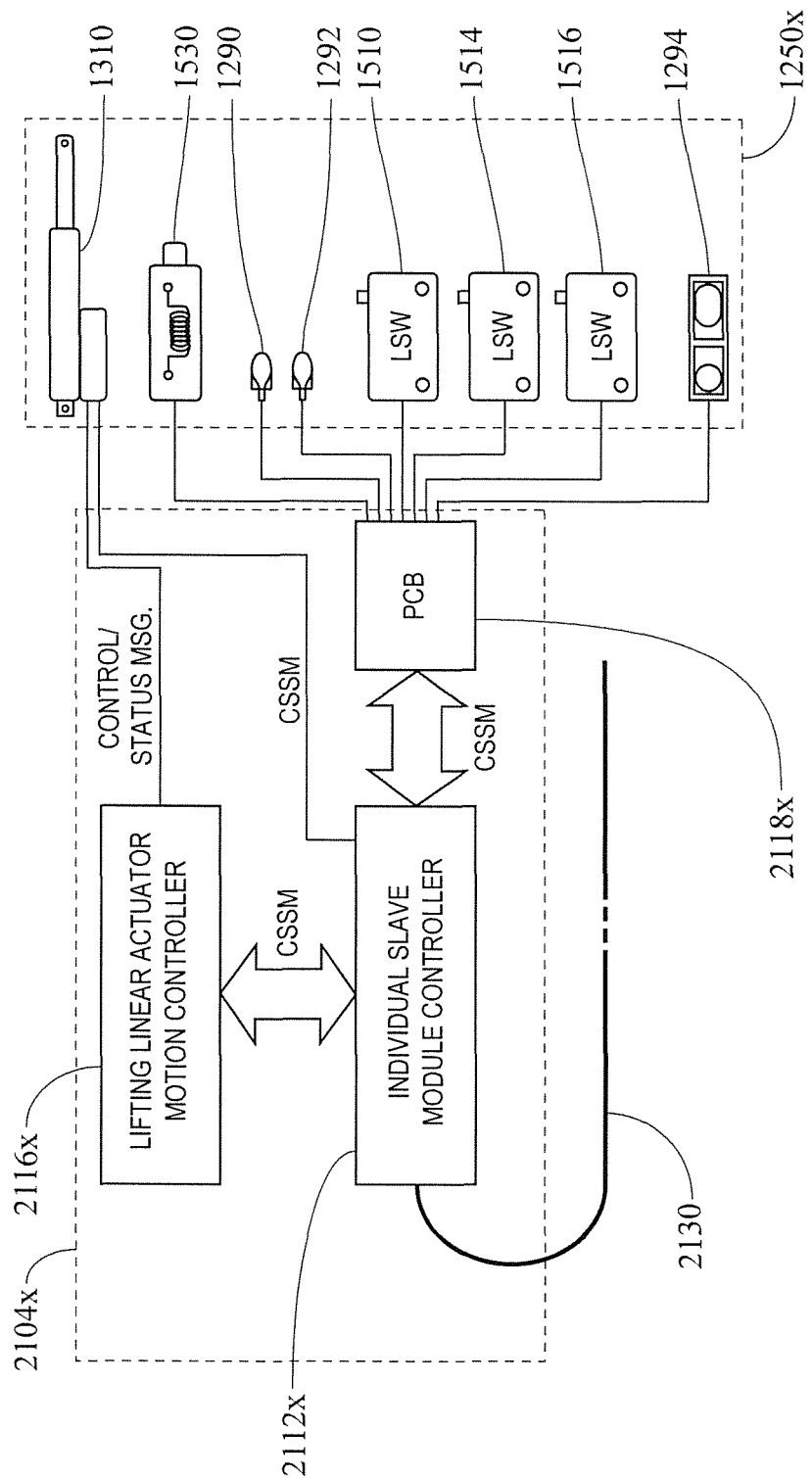

Referring to FIGS. 6(A-B) block electrical schematic diagram of the control circuitry (i.e., a section of the system control apparatus 2000) related to control of the master (primary, full-function) module 1102 is shown. As would be known to one of skill in the art; hence not illustrated, the individual motor controller 2112 (e.g., on FIG. 6A, the individual motor controller 2112_PM, and on FIG. 6B, individual motor controller 2112*x*) generally comprises three (3) physical devices: (i) an H-bridge motor driver, (ii) supporting circuitry, and (iii) a microcontroller with software/firmware (computer programming) to perform the processes (e.g., methods, steps, blocks, etc.) as described herein.

The H-bridge comprises an electronic circuit that may be controlled to apply a voltage across a load in either direction. The H-bridge circuit is implemented to provide reversible linear direction control for DC motors (e.g., bi-directional linear actuators) such that the motors may run forwards and backwards (e.g., an actuator shaft may be commanded to move in and out). The H-bridge motor driver is used to energize the linear actuators that are implemented in the modular handling and stowage system 1000. The H-bridge motor driver amplifies the actuator control signals that are received from the microcontroller.

The supporting circuitry provides interfacing to the microcontroller. The circuitry performs tasks that include: providing voltage sources for switches and potentiometers in the actuators, adding pull down resistors for switches, holding a voltage divider for light emitting diodes (LEDs, i.e., visual indicators) and driving a power on/off solenoid assembly.

The microcontroller provides the capability of processing analog and digital electrical inputs and outputs. The microcontroller including memory runs software and/or firmware that includes an initialization routine and a main loop (described below, particularly in connection with FIGS. 7-11). The initialization routine part of the software runs at each power-on sequence and establishes the input and output pins of the microcontroller. The initialization software routine also sets up (establishes) the serial port connection parameters to communicate with JAUS components in the system control apparatus 2000. The initialization software routine also launches the main loop software.

Referring to FIG. 6A, a block electrical schematic diagram of the control circuitry (i.e., a section of the system control apparatus 2000) related to control of the master (primary, full-function) module 1102 is shown. The primary module control sub-system 2102 comprises the modules supervisory controller 2110, the individual master (primary) module controller (e.g., individual module controller) 2112_PM, a clamping linear actuator motor controller 2114, a lifting linear actuator motor controller 2116, and a primary module controller printed circuit board (PCB) 2118_PM.

The primary individual module controller 2112_PM generally comprises unique programming (that is, software and/or firmware that may be different that the software that is implemented in connection with the secondary module individual controllers 2112(*a-n*)). The individual primary module controller 2112_PM further comprises electrical coupling (e.g., connections, links, communication, etc.) to the lifting linear actuator 1310, the clamping linear actuator 1340, the modules supervisory controller 2110, the clamping linear actuator motor controller 2114, the lifting linear actuator motor controller 2116, and the primary module controller printed circuit board 2118.

The individual primary module controller 2112_PM is generally electrically coupled to a primary module sensor suite (e.g., set, group, array, etc.) 1250 (e.g., the primary module sensor suite 1250_PM) that comprises: a first primary visual indicator 1290, a second primary visual indicator 1292, a primary IR distance (primary optical nose position) sensor 1294, a first (primary support tray) lever operated limit switch 1500, a second lever operated (primary nose position) limit switch 1510, a clamp dog position push-button (primary clamp dog) limit switch (i.e., the first push-button limit switch) 1514, and a push-solenoid (primary shuttle switching) assembly 1530 via the primary module controller printed circuit board 2118. In addition, the primary module sensor suite 1250_PM comprises the lifting linear actuator 1310 and the clamping linear actuator 1340.

The primary individual motor controller 2112_PM may be linked to the co-located master module modules supervisory controller 2110 through the serial communications link 2130. When the modular handling and stowage system 1000 includes one or more of the secondary modules 1104, primary individual motor controller 2112_PM may be linked to the secondary module control sub-systems 2104 via the serial communications link 2130.

One of skill in the art will appreciate that the selection, placement, and orientation of the various components such as the clamp dog 1350, components of the primary module sensor suite 1250_PM, switches, sensors, indicators, potentiometers, solenoids, and the like will depend on the design criteria of a particular implementation of the robot 100 and of the primary module 1102. Such a skilled artisan will be able to determine the operable placement and orientation by routine experimentation.

In accordance with the description of the operation and processes that are generally implemented in connection with the primary module 1102, the following signals (e.g., the signal Control/Status Msg or CSSM) may be presented to, from, and within the system control apparatus 2000:

a primary extract signal (e.g., command) that is presented via the OCU 2012 when extraction of the vehicle 100 and stowage within the primary module 1102 is desired;

a primary deploy signal that is presented via the OCU 2012 when deployment of the vehicle 100 from the primary module 1102 is desired;

a primary tray deployed position (e.g., status) signal presented via the primary tray lever operated limit switch 1500 indicating that the primary module support tray 1230 is in the deployed position;

a primary nose position signal that is presented via the primary nose position limit switch 1510 when the nose 120 reaches the clamping position;

a primary clamp dog horizontal position signal that is presented via the primary clamp dog limit switch 1514 indicating that the primary clamp dog 1350 is fully open;

a primary over-run position signal that is presented via the primary optical nose position sensor 1294 when the nose 120 of the vehicle 100 exceeds the clamping position;

a clamping linear actuator position feedback signal that is presented by the clamping linear actuator 1340 when the primary clamp dog 1350 rests against the nose 120;

a primary clamp dog off-horizontal position signal that is presented via the primary clamp dog limit switch 1514 indicating that the primary clamp dog 1350 has moved from the horizontal position;

a primary tray off-deployed position signal that is presented via the primary tray lever operated limit switch 1500 indicating that the primary module support tray 1230 has moved from the deployed position;

a vehicle primary stored status signal that is presented via the primary individual module motor controller 2112_PM when (i) the primary tray lever operated limit switch 1500 indicates that the primary module support tray 1230 has moved from the deployed position and (ii) the primary clamp dog limit switch 1514 indicates that the primary clamp dog 1350 has moved from the horizontal position, thereby indicating that the vehicle 100 is stored in the primary module 1102; and a primary power control (e.g., command) signal that is presented via the OCU 2012 when the primary shuttle switching assembly 1530 is actuated thereby toggle switching the vehicle 100 battery power on and off.

Referring to FIG. 6B, a block electrical schematic diagram of the control circuitry (i.e., a section of the system control apparatus 2000) related to control of the secondary module 1104 is shown. The secondary module control sub-system 2104*x* comprises the slave (secondary) individual module controller 2112*x*, the lifting linear actuator motor controller 2116, and a secondary module controller printed circuit board (PCB) 2118*x*.

The secondary individual module controller 2112*x* generally comprises unique programming (that is, software and/or firmware that may be different that the software that is implemented in connection with the primary module controller 2112_PM). The secondary module controller 2112*x* further comprises electrical coupling (e.g., connections, links, communication, etc.) to the lifting linear actuator 1310, the lifting linear actuator motor controller 2116*x*, and the secondary module controller printed circuit board 2118*x*. The secondary module controller 2112*x* further comprises electrical coupling to the primary module 1102 (i.e., the primary individual motor controller 2112_PM) via the serial communications link 2130.

The secondary individual module controller 2112*x* is generally electrically coupled to a secondary module sensor suite (e.g., set, group, array, etc.) 1250 (e.g., the secondary module sensor suite 1250*x*) that comprises: a first secondary visual indicator 1290, a second secondary visual indicator 1292, a secondary IR distance (secondary optical nose position) sensor 1294, a second lever operated (secondary nose position) limit switch 1510, the clamp dog position push-button limit (secondary clamp dog) switch (i.e., the first push-button limit switch) 1514, a second push-button (secondary support tray) limit switch 1516, and a push-solenoid (secondary shuttle switching) assembly 1530 via the secondary module controller printed circuit board 2118*x*. In addition, the secondary module sensor suite 1250*x* comprises the lifting linear actuator 1310.

One of skill in the art will appreciate that the selection, placement, and orientation of the various components such as the clamp dog 1350, switches, sensors, indicators, potentiometers, solenoids, components of the sensor suite 1250*x*, and the like will depend on the design criteria of a particular implementation of the robot 100 and of the secondary module 1104. Such a skilled artisan will be able to determine the operable placement and orientation by routine experimentation.

In accordance with the description of the operation and processes that are generally implemented in connection with the secondary module 1104, the following signals (e.g., the signal Control/Status Msg or CSSM) may be presented to, from, and within the system control apparatus 2000:

a secondary extract signal that is presented via the OCU 2012 when extraction of the vehicle 100 and stowage within the secondary module 1104 is desired;

a secondary deploy signal that is presented via the OCU 2012 when deployment of the vehicle 100 from the secondary module 1104 is desired;

a secondary tray deployed position signal that is presented via the secondary tray limit switch 1516 when the secondary module support tray 1240 reaches the deployed position;

a secondary nose position signal that is presented via the secondary nose position limit switch 1510 when the nose 120 reaches the clamping position;

a secondary clamp dog horizontal position signal that is presented via the secondary clamp dog limit switch 1514 when the secondary clamp dog 1350 reaches the horizontal position;

a secondary over-run position signal that is presented via the secondary optical nose position sensor 1294 when the nose 120 of the vehicle 100 exceeds the clamping position;

a secondary clamp dog off-horizontal position signal that is presented via the secondary clamp dog limit switch 1514 indicating that the secondary clamp dog 1350 has moved from the horizontal position;

a secondary tray off-deployed position signal presented via the secondary tray limit switch 1516 indicating that the secondary module support tray 1240 has moved from the horizontal position;

a vehicle secondary stored status signal that is presented via the secondary tray module motor controller 2112 when (i) the secondary tray limit switch 1516 indicates that the secondary module support tray 1240 has moved from the deployed position and (ii) the secondary clamp dog limit switch 1514 indicates that the secondary clamp dog 1350 has moved from the horizontal position, thereby indicating that the vehicle 100 is stored in the secondary module 1104; and a secondary power control signal that is presented via the OCU 2012 to actuate the secondary shuttle switching assembly 1530 thereby toggle switching the vehicle 100 battery power on and off.

Figure 7:
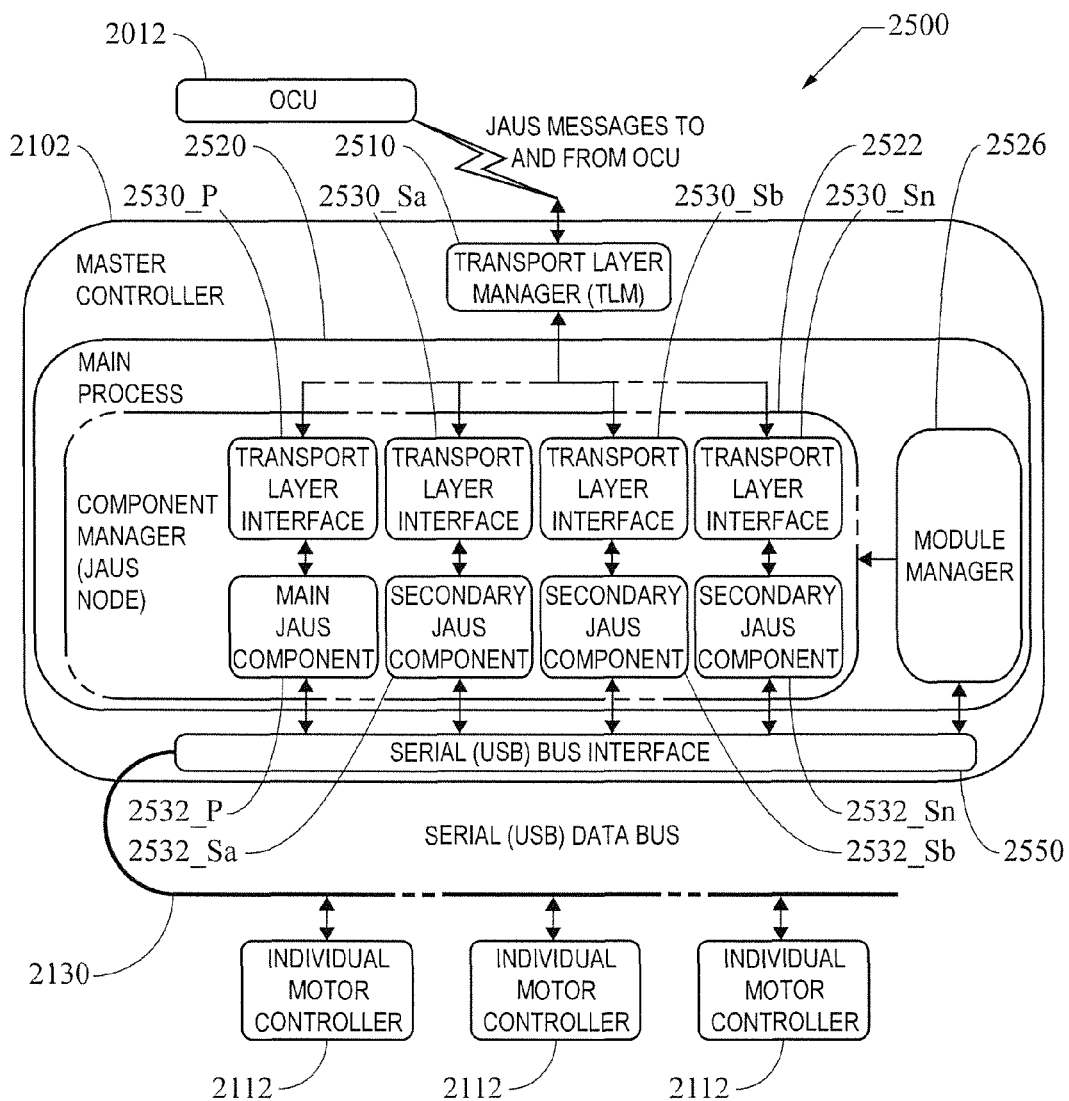
FIG. 7 is a block, electrical schematic diagram of software architecture of the primary module controller of FIG. 5.
Figure 8A:
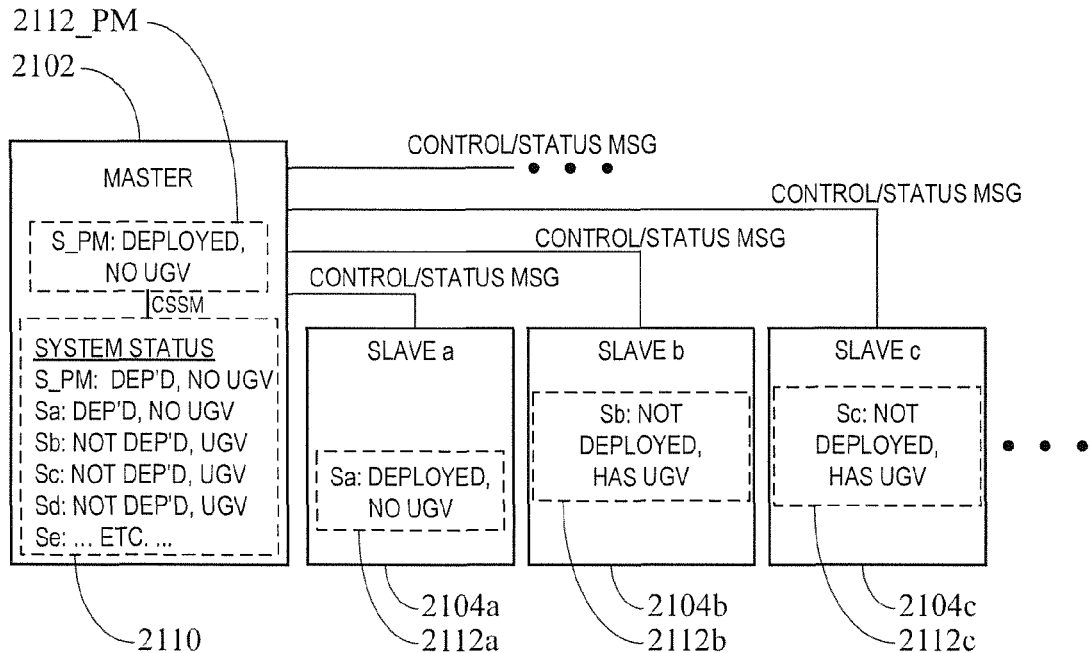
FIGS. 8(A-B) are block diagrams illustrating a variety of information and states that may be observed, controlled, communicated, and monitored via the control apparatus of FIG. 5.
Figure 8B:
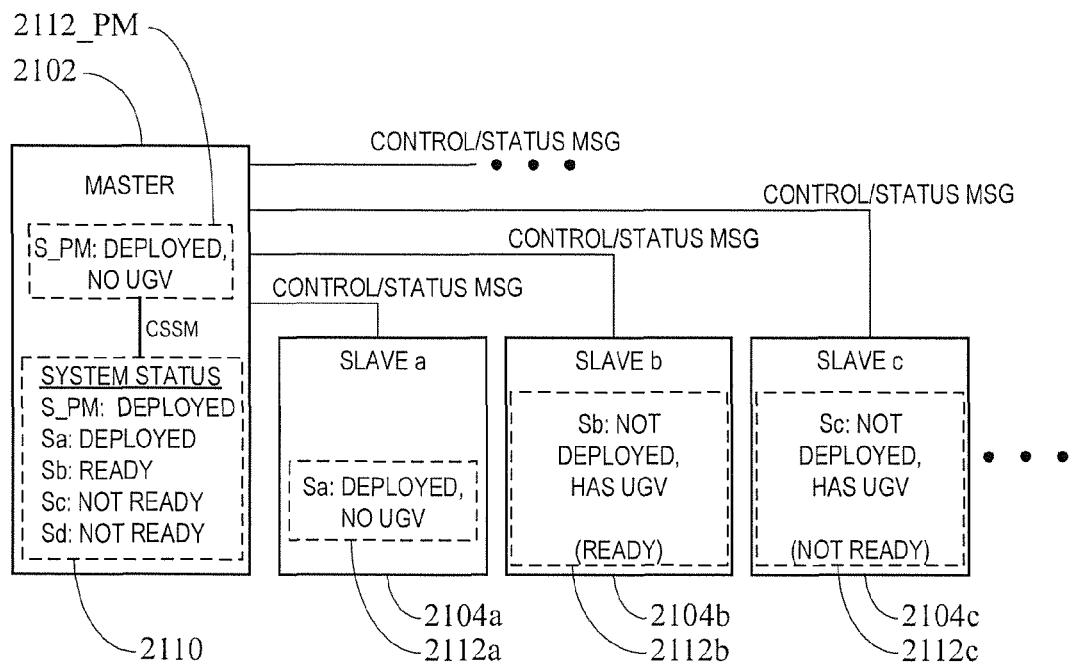

Referring to FIG. 7, a block, electrical schematic diagram illustrating software architecture 2500 of the primary module controller 2102 is shown. The primary module controller 2102 is generally electrically coupled to the operating control unit 2012 and, thus, bi-directionally presents and receives signals (e.g., JAUS messages) to and from the operating control unit 2012. The software architecture 2500 of the primary module controller 2102 comprises a transport manager layer 2510, a main process segment 2520, and a serial bus (e.g., USB) interface 2550. The transport manager layer 2510 is electrically coupled between the operating control unit 2012 and the main process segment 2520.

The main process segment 2520 generally comprises a component manager (i.e., management process, steps, etc.) (e.g., a JAUS node) 2522 and a module manager 2526. The component manager process 2522 is electrically coupled to the module manager 2526; and the module manager 2526 is electrically coupled to the serial bus interface 2550. The main process (i.e., method, steps, etc.) segment 2520 further generally comprises programming that is configured as a state machine 4000 which is described below in connection with FIGS. 10(A_C). The software that comprises the state machine 4000 generally principally resides in memory in the modules supervisory controller 2110; however, one of skill in the art would understand that the state machine 4000 (control software) may be implemented in any of one or more appropriate locations to meet the design criteria of a particular case. As such, the description herein is exemplary, and not limiting.

The component manager process 2522 comprises a plurality of transport layer interfaces 2530 (e.g., primary module transport layer interface 2530_P, and secondary module transport layer interfaces 2530_Sa-2530_Sn) and a plurality of signal management (e.g., JAUS) components 2532 (e.g., main JAUS signal management component 2532_P, and secondary JAUS signal management components 2532_Sa-2532_Sn). The transport layer interfaces 2530 are each electrically coupled to the transport manager layer 2510 and to one of the signal management (JAUS) components 2532. The signal management components 2532 are each electrically coupled to the serial bus interface 2550. There is generally a JAUS signal management component 2532 (e.g., the main JAUS signal management component 2532_P) that is dedicated to master controller 2102 related operations (i.e., primary module 1102 operations); and the other signal management JAUS components 2532 (e.g., the secondary JAUS signal management components 2532_Sa-2532_Sn) that are generally dedicated to secondary module 1104a-1104n related operations.

The serial bus interface 2550 is electrically coupled to each of the individual motor controllers 2116 via the serial (USB) bus 2130.

Referring to FIGS. 8(A-B), block diagrams illustrating two examples of a variety of information (e.g., data, commands, statuses, states (poses), and the like) that may be observed, controlled, communicated, and monitored in the module group 1000 via the system control apparatus 2000 are shown. The primary module control sub-system 2102 generally includes the real time status (e.g., Sx, where x indicates a particular module 1102 or 1104) for the primary module 1102, and the secondary modules 1104 in the primary module modules supervisory controller 2110.

The information that is presented via a status message signal (e.g., the signal Control/Status Msg or CSSM) from the primary and/or secondary individual motor controllers 2112 to the primary module modules supervisory controller 2110 may be in terms of executing an extraction or deployment command or operation, and may also include real time information with regards to the presence of the robot 100 within each module 1102 and/or 1104, and whether each module 1102 and/or 1104 is an extraction or deployment mode of operation of the robot 100, and the like.

In one example (illustrated on FIG. 8A), the individual motor controller 2112_PM presents a status message signal (e.g., S_PM) "Deployed, No UGV" to the primary module modules supervisory controller 2110; the individual motor controller 2112a presents a status signal (e.g., Sa) "Deployed, No UGV" to the primary module modules supervisory controller 2110; the individual motor controller 2112b presents a status signal (e.g., Sb) "Not Deployed, Has UGV" to the primary module modules supervisory controller 2110; and the individual motor controller 2112c presents a status signal (e.g., Sc) "Deployed, Has UGV" to the primary module modules supervisory controller 2110.

In another example (illustrated on FIG. 8B), the individual motor controller 2112_PM presents the status signal, S_PM, "Deployed, No UGV" to the primary module modules supervisory controller 2110; the individual motor controller 2112a presents the status signal, Sa, "Deployed, No UGV" to the primary module modules supervisory controller 2110; the individual motor controller 2112b presents the status signal, Sb, "Not Deployed, Has UGV, (Ready)" to the primary module modules supervisory controller 2110; and the individual motor controller 2112c presents the status signal, Sc, "Deployed, Has UGV, (Not Ready)" to the primary module modules supervisory controller 2110.

The system control apparatus 2000 generally limits deployment of the UGVs 100 from the modules 1102 and 1104 to the UGVs 100 that are in a condition for deployment (e.g., a "Ready" state, pose, or mode). The modules supervisory controller 2110 also generally provides extraction/storage/deployment operation, and interlock lockout failsafe to each module 1102 and 1104 to eliminate deployment errors. In particular, as well as status signals, the system control apparatus 2000 generally communicates signals with the modular handling and stowage system (module group) 1000 that may be related to command and control operations (e.g., lift, lower, actuate, extend/retract, deploy, extract, power on/off, rotate, feedback, etc.), and monitoring (e.g., alert) (e.g., safe/not safe, clear/blocked, in/out of position/alignment, etc.).

Figure 9:
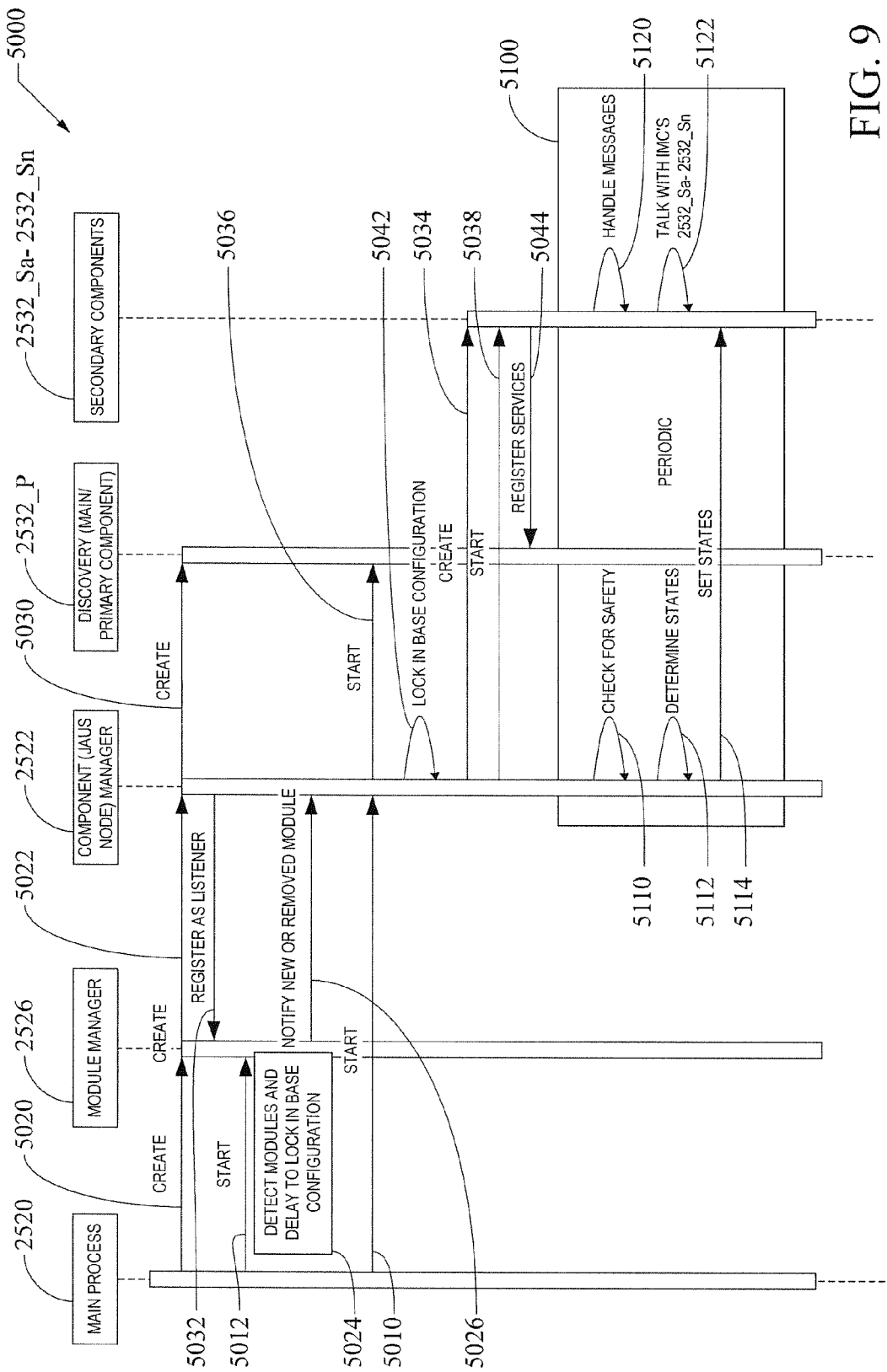
FIG. 9 is a start-up and run-time sequence map of the control apparatus of FIG. 5.

Referring to FIG. 9, a start-up and run-time sequence map 5000 of the system control apparatus 2000 of FIG. 5 is illustrated. Continuing to refer to FIG. 9 and also referring back to FIGS. 4 and 5, the modules supervisory controller 2110 initializes and runs two processes, that is, (i) a node manager (e.g., component manager process, JAUS node, and the like) 2522, and (ii) the main process 2520. The component manager process (e.g., node manager) 2522 manages the message traffic for the node (i.e., the primary module modules supervisory controller 2110). As noted above, the message traffic is conducted via the JAUS standards. The start-up and run-time sequence map 5000 generally illustrates the operation (e.g., steps, coordination, loops, routines, and the like) of timing control programming (e.g., computer software) related to the state machine 4000.

An initialization process begins with the starting of the component manager process 2522 (e.g., step 5010), which provides the capability for components on the system control apparatus 2000 to pass messages between each other and off-board. The main process 2520 is started after the node manager (e.g., component manager process) 2522 is running, and the main process 2520 connects to the component manager process (e.g., node manager, JAUS, node, and the like) 2522, thereby providing the capability for the main process 2520 to send and receive messages.

After the main process 2520 is started (e.g., step 5012), two new objects are created, namely, the module manager 2526 (e.g., step 5020) and the component manager process (JAUS node) 2522 (e.g., step 5022). The module manager 2526 detects the individual motor controllers 2112 as they are discovered (detected) or lost (detached) (e.g., step or block 5024), and notifies receiving devices (i.e., listeners) (e.g., other components of the system control apparatus 2000) when discovery and/or loss events occur (e.g., step 5026).

The component manager process 2522 creates a single, signal management (e.g., JAUS) component 2532 for each of the primary and the secondary individual motor controller 2112 that is detected (e.g., step 5030), and manages the JAUS signal management components 2532 as a group. Both of the module manager 2526 and the component manager process 2522 provide messages threads (i.e., the command signals, the status signals, etc.) for execution by the affected devices in the modular handling and stowage system 1000.

After creation of the module manager 2526 and the component manager process 2522, the component manager process 2522 is registered as a listener (e.g., receiver) to the module manager 2526 to enable reception of notifications (e.g., the status signals) of when any of the primary and/or individual motor controllers 2112 are discovered or lost (e.g., step 5032). The JAUS signal management components 2532 are created or deleted as the secondary modules 1104 are discovered or lost (e.g., attached or detached, added or removed, etc.) (e.g., step 5034). There is one of the JAUS signal management components 2532 for each of the secondary modules 1104 that is discovered. The JAUS signal management component 2532 sends (presents) messages (e.g., the status signals) to and receives messages from the primary and/or secondary individual motor controllers 2112. The JAUS signal management component 2532 also maintains the state (e.g., pose) for the primary and/or secondary individual motor controller 2112.

The module manager 2526 is started substantially immediately after the component manager process 2522 is registered as a listener to the module manager 2526 notifications, thereby allowing the component manager process 2522 to be informed of any of the secondary modules 1104 that are present in the system control apparatus 2000. After a set (e.g., predetermined, selected, etc.) period of time has elapsed, the component manager process 2522 is started (e.g., steps 5036 and 5038), and a base configuration of secondary modules 1104 is locked in within the component manager process 2522 (e.g., step 5042) and services are registered (e.g., step 5044). The base configuration comprises the configuration of the modular handling and stowage system (module group) 1000 (i.e., which secondary modules 1104 are present and which modules are adjacent to one another) that will be used for comparison through the run-time of the system control apparatus 2000. After the base configuration is locked in, the component manager process (e.g., JAUS node) 2522 is activated.

The activation process performs the following steps:

A) Checking the system control apparatus 2000 for module continuity; and when there are gaps between modules (e.g., Module 1 and Module 3 are detected but Module 2 is not), setting a failure condition (e.g., an ERROR status).

B) Activating each of the individual signal management (JAUS) components 2532, where activation of the JAUS signal management component 2532 includes performing a communications check with the primary or secondary individual motor controller 2112 that is controlled thereby.

C) Determining the initial state of the system control apparatus 2000. The state of all individual (JAUS) signal management components 2532 is determined using their internal state (i.e., STOWED or DEPLOYED) and the state of the adjacent modules (primary) 1102 and/or (secondary) 1104. The state can also be considered the pose.

D) Controlling of each (JAUS) signal management component 2532, thereby providing control (e.g., management) via the OCU 2012, to request and receive control of each JAUS signal management component 2532, in turn providing control of the individual modules (primary) 1102 and (secondary) 1104.

After the activation process occurs, a periodic (e.g., repeated) main loop (e.g., block of steps 5100) starts. The main loop 5100 continues until the component manager process 2522 is stopped. Within the main loop 5100, two primary sub-processes occur: safety checks (e.g., step or loop 5110) and state determination (e.g., step or pool 5112). The safety checks 5110 are generally performed first. When a safety check fails, the system control apparatus 2000 is put into a failure state and may reset to recover normal operation.

The safety check 5110 includes checking whether any (JAUS) signal management component 2532 is reporting an individual failure (i.e., a failure within the individual module controller 2112), checking whether the present configuration (i.e., the condition that is checked) varies from the base configuration (that is, whether the primary module 1102 and/or one or more of the secondary modules 1104) has been lost or gained since the component manager process 2522 was started, and checking to determine whether communication has been lost to any of the primary and/or secondary individual motor controllers 2112. Any failure condition that is detected and set by the safety check step 5110 of the main loop 5100 is propagated (i.e., communicated) to all of the JAUS signal management components 2532.

The second sub-process within the main loop 5100 is the state determination step 5112 which determines the current state of the system control apparatus 2000. The state determination step 5112 assesses the state (also known as a pose) of each of the primary and secondary signal management components 2532 within the system control apparatus 2000. The state determination 5112 assesses the internal state of the individual motor controller 2112 that the primary and/or secondary signal management component 2532 represents, and also the states of the immediately adjacent (, e.g., neighbor, directly connected, etc.) modules, to determine the state of an individual primary and/or secondary signal management component 2532. For example, when the individual motor controller 2112a (implemented in connection with the secondary signal management component 2532_Sa of the Module 2) is in the "stowed" state and both of the primary signal management component 2532_P of the Module 1 and the secondary signal management component 2532_Sb of the Module 3 which are adjacent to the secondary signal management component 2532_Sa are in the "stowed" state, the state of the secondary signal management component 2532_Sa is determined to be "stowed" (i.e., not clear to deploy).

When the module manager 2526 and the component manager process 2522 are running, the primary signal management component 2532_P and all of the secondary signal management components 2532_S that have been created are also running their own individual thread plus threads for an associated "Discrete State Driver" service. The Discrete State Driver service is an earlier version of an interoperability profile (TOP) defined service called the "Preset Pose Service".

The principal responsibility (e.g., highest priority sub-process) of the signal management component 2532 thread (i.e., software routine) is to read and process messages (e.g., the signals) (e.g., step or loop 5120) from the associated individual motor controller 2112. These messages are generally, primarily status messages, error messages, acknowledgements and negative acknowledgements of command signals. The signal management component 2532 also listens for notifications from the Discrete State Driver service. These notifications are based on messages that the Discrete State Driver service receives, the most important of these being a "set current state request" notification (e.g., step 5114) that occurs (e.g., is presented) when the Discrete State Driver service receives a message indicating a request to change the current state (pose) of the signal management component 2532.

Based on (e.g., in response to) the indicated state requested within the notification, the signal management component 2532 sends (presents) the appropriate command to the individual motor controller 2112 (e.g., step or loop 5122). The signal management component 2532 tracks the command in a list to determine when the command has been "closed out" (i.e., affirmative confirmation that the command completed). The signal management component 2532 initially waits for an affirmative acknowledgement message from the individual motor controller 2112, which is the first part of closing out the command. The final part of closing out the command is a status message from the individual motor controller 2112 that indicates the requested state has been achieved.

Referring to FIGS. 10(A-C), state diagrams of operation and transition modes of the state machine (i.e., state control programming) 4000 for the primary (master) module controller apparatus 2102 are illustrated. Success conditions are generally based on sensor signals (e.g., signals that are received from the primary module sensor suite 1250_and secondary module sensor suites 1250a-1250n, when implemented) and command signals. Internal transitions are generally automatically implemented by the master module controller apparatus 2102, in particular, the modules supervisory controller 2110; i.e., are not implemented by command signals (e.g., signals that originate from the User via the control unit 2012 and/or sensors). The transitions may be generated (result) internally (e.g., autonomously, self-directed, automatically, without receipt of a command signal) or, alternatively, as a "valid" transition, i.e., a transition that is initiated via the receipt of an appropriate command signal (i.e., command-directed, user-directed, and the like).

Figure 10A:
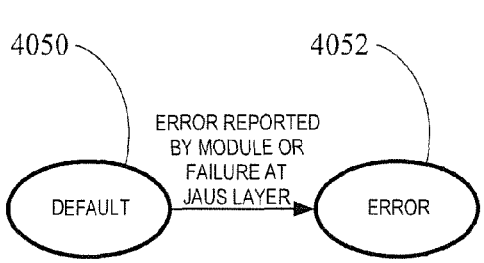
FIGS. 10(A-C) are state diagrams of the control apparatus of FIG. 5.

Referring to FIG. 10A, a state diagram illustrating a basic, internal (autonomous) transition of states from a default condition to an error condition is shown. States may be defined as:

4050: DEFAULT—Represents any normal (i.e., non-ERROR) operational state.

4052: ERROR—Error condition that is recovered by restarting the state machine 4000.

When the state is at the DEFAULT, 4050, and the ERROR 4052 condition is presented to the master module controller apparatus 2102 from any source, the state machine 4000 generally transitions autonomously to the ERROR state, 4052.

Figure 10B:
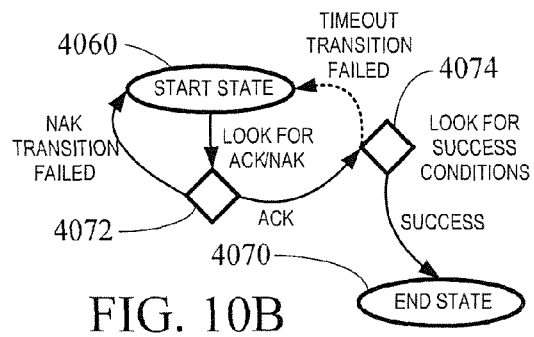

Referring to FIG. 10B, a state diagram illustrating valid transitions of states from a starting condition to an end condition is shown. The states may be defined as:

4060: START state.

4070: END state.

Signals presented and received that comprise at least a part of the status signals that generate the state transitions may be defined as:

ACK—Communicates (presents) acknowledgement or proper receipt of response; and

NAK—Communicates rejection of a previously received message, or indicates a failure condition or an ERROR state.

Decision blocks may include:

4072: ACK/NAK block—Determine which of ACK and NAK is presented.

4074: SUCCESS/FAIL block—Determine whether SUCCESS condition or TIMEOUT/Transition FAILED condition occurred.

Beginning at the START, 4060 state, and transitioning to the decision block 4072 (i.e., looking (determining) whether the ACK or the NAK signal has been received), when the NAK signal (e.g., the Transition FAILED) is found (i.e., determined, received, etc.), the state machine 4000 generally transitions back to the START, 4060 state; and when the ACK signal is determined, the state machine 4000 generally transitions to the SUCCESS/FAIL decision block, 4074.

At the SUCCESS/FAIL decision block, 4074, when the TIMEOUT/Transition FAILED condition occurs, the state machine 4000 generally transitions back to the START, 4060 state; and when the SUCCESS condition occurs, the state machine 4000 generally transitions to the END state, 4070.

Figure 10C:
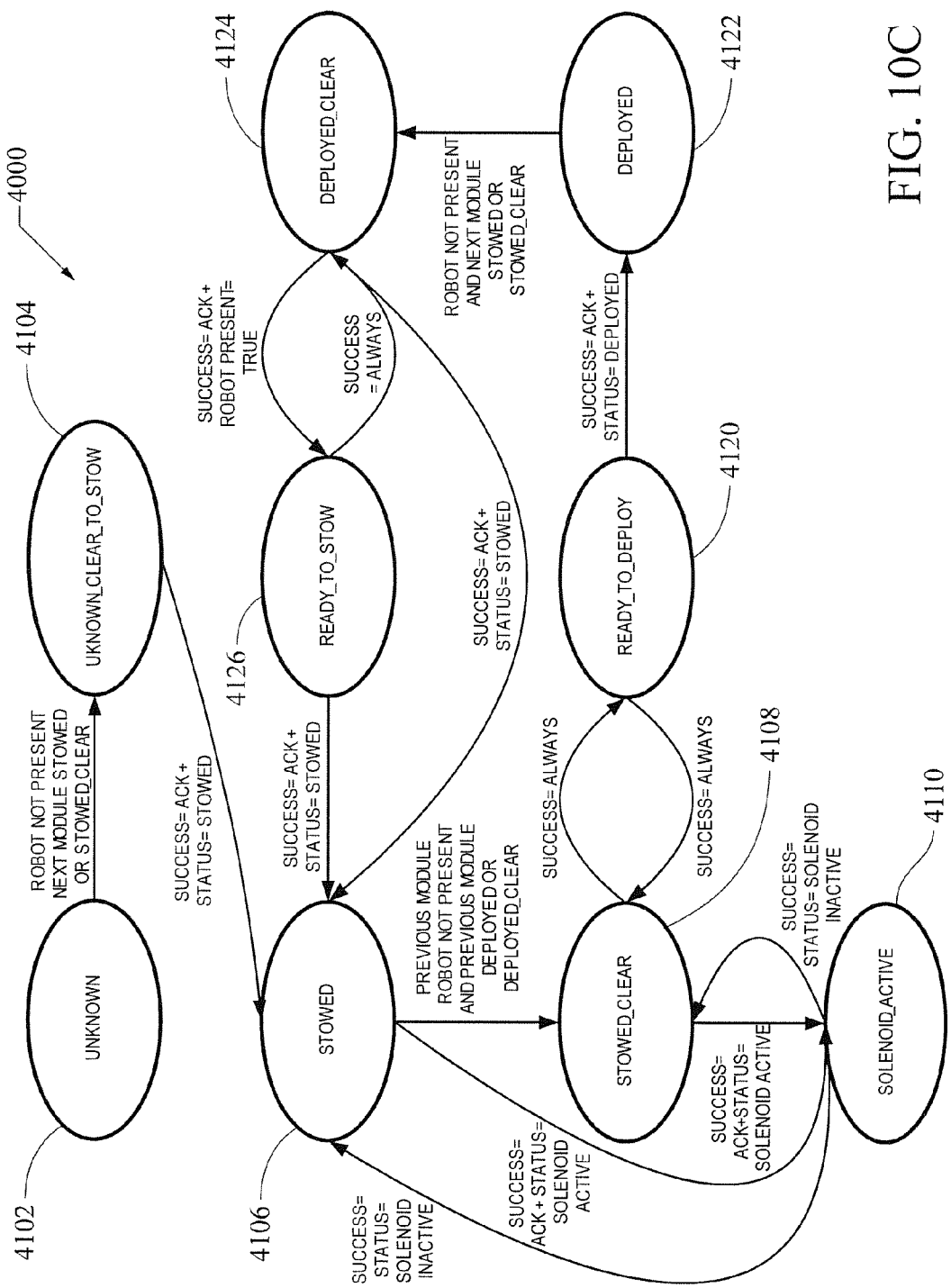

Referring to FIG. 10C, a state diagram for the state machine 4000 illustrating transitions between states that are implemented in the primary and secondary modules 1102 and 1104, respectively, are shown. The states (e.g., poses) are generally comprised further as follows:

4102: UNKNOWN—The individual motor controller 2112 is reporting (presenting a signal and/or signals that indicate) an unknown state, i.e., the status of the module support tray 1230 and/or 1240 and of the presence of a robot 100 are yet to be determined.

4104: UNKNOWN_CLEAR_TO_STOW—The individual motor controller 2112 is reporting an unknown state and the component manager process 2522 has determined that the module 1102 or 1104 is clear to be stowed based on the states of neighboring (adjacent) modules 1102 and/or 1104.

4106: STOWED—The primary module support tray 1230 in the case of the primary module 1102 and the secondary module support tray 1240 in the case of the secondary module 1104 is in the stowed position; however, the module support tray is not clear to be deployed.

4108: STOWED_CLEAR—The primary module support tray 1230 in the case of the primary module 1102 and the secondary module support tray 1240 in the case of the secondary module 1104 is in the stowed position, and the module support tray is clear to be deployed.

4110: SOLENOID_ACTIVE—Transition thereto indicates that the solenoid shuttle switching assembly 1530 is active and thereby turning on/off (i.e., activates/deactivates, toggles, in a switching mode of operation, and the like) the robot 100 internal power.

4120: READY_TO_DEPLOY—Defined as when the User (via the OCU) indicates readiness to deploy the UGV 100 from the selected module 1102 or 1104. The module 1102 or 1104 is considered ready to deploy after the User has confirmed that the robot 100 contained therein is powered up (on) and has active communication links.

4122: DEPLOYED—The primary module support tray 1230 in the case of the primary module 1102 and the secondary module support tray 1240 in the case of the secondary module 1104 is in the deployed position, but is not clear to be stowed.

4124: DEPLOYED_CLEAR—The primary module support tray 1230 in the case of the primary module 1102 and the secondary module support tray 1240 in the case of the secondary module 1104 is in the deployed position and is clear to be stowed.

4126: READY_TO_STOW—Indicates to the individual motor controller 2112 associated with the module 1102 or 1104 that a robot 100 is in the process of loading for stowage.

Also, referring back to FIG. 4, an example of module internal state determination in the modular handling and stowage system (module group) 1000 having the primary module 1102 coupled to the first secondary module 1104a; and the first secondary module 1104a coupled to the second secondary module 1104b may be as follows. For explanatory purposes, the master module 1102 (at the rear of the module group 1000) may be assigned the designation Module 1, the first secondary module 1104 (i.e., the secondary module 1104a) the designation Module 2, and the second secondary module 1104 (i.e., the secondary module 1104b), Module 3.

The Module (e.g., the primary module 1102 and the secondary modules 1104) state determinations are generally conducted in order (i.e., serially, sequentially, etc.) from the Module 1 to the Module 3 (or higher, when more of the modules 1104 are implemented). The state of the (primary) Module 1 is determined from a self state determination process and from the determination of the state of the Module 2, which is electrically and mechanically coupled directly to the Module 1. The internal state of the individual motor controller 2112_PM that is associated with the Module 1 is "deployed" with "robot present", which means the state of the Module 1 is either DEPLOYED (e.g., the state 4122) or DEPLOYED_CLEAR (e.g., the state 4124). As the internal state of the individual motor controller 2112a that is associated with the Module 2 is "stowed", the Module 1 is at the state of DEPLOYED_CLEAR 4124.

The state of the Module 2 is dependent on its own internal state as well as that of the states of the Modules 1 and 3. In this case (i.e., as illustrated on FIG. 4), the internal state of the Module 2 is "stowed". The only condition that provides the Module 2 clearance to deploy is when the Module 1 is fully deployed without the robot 100 present. As such, in the situation illustrated on FIG. 4, the state of the Module 2 is STOWED (e.g., the state 4106).

The state of the Module 3 depends on its own internal state and the internal state of the adjacent Module, that is, the internal state of the Module 2. The internal state of the Module 3 is also STOWED (e.g., the state 4106) because the Module 3 is not clear to be deployed, that is, deployment from the Module 3 is blocked by the Module 2 (e.g., the robot 100a that is stowed in the Module 2).

Throughout the modular handling and stowage system (e.g., module group) 1000, the determination of the state of a Module_x is generally performed via the component manager process 2522. As described above in connection with FIG. 9, the component manager process 2522 regularly (i.e., periodically) assesses and updates the state of the Module_x (i.e., the JAUS component manager process 2522). The state is determined based on the internal state of the individual motor controller $2112x$ that is associated with the particular Module_x (e.g., the particular module 1102 or 1104), and the state of the neighboring (e.g., adjacent, directly coupled electrically and mechanically) two Modules 1102 and/or 1104 (e.g., next position rearward (lower, below, down) Module_(x−1) and next position forward (higher, above, up) Module_(x+1)). As defined above, there are six (6) internal states that the individual motor controller 2112 can report: Stowed, Stowing, Deployed, Deploying, Error, and Unknown. The rule set for determining the state of the Module_x may be summarized as:

When more than one Module is moving (transitioning) at a time, the Modules that are transitioning go to the error state 4052.

When the internal state of the individual motor controller $2112x$ is stowed, the state of the Module_x is either STOWED (e.g., the state 4106) or STOWED_CLEAR (e.g., the state 4108). Clear is indicated by determining whether anything would prevent the Module_x from being deployed (i.e., any of the Modules<(below) the Module_x are not deployed or contain the robot 100).

When the internal state of the individual motor controller $2112x$ is deployed, then the state of the Module_x is either DEPLOYED (e.g., the state 4122) or DEPLOYED_CLEAR (e.g., the state 4124). Clear is indicated by determining whether anything would prevent the Module_x from being stowed (i.e., any of the Modules>(above) the Module_x are not stowed completely).

When the internal state of the individual motor controller $2112x$ is unknown, then the state of the Module_x is either UNKNOWN (e.g., the state 4102) or UNKNOWN_CLEAR_TO_STOW (e.g., the state 4104). Clear is indicated by determining whether anything would prevent the Module_x from being stowed (i.e., any of the Modules<the Module_x are not stowed completely).

The Module_x stays in the SOLENOID_ACTIVE (e.g., the state 4110) state until the individual motor controller $2112x$ reports (i.e., presents a signal that indicates) that the solenoid activation process is complete.

When the Module_x is clear to stow and the robot $100x$ is present, the Module_x is considered to be in the READY_TO_STOW state (e.g., the state 4126) regardless of whether or not the User presented the command signal appropriate to transition the Module_x to the READY_TO_STOW state 4126.

Error states (e.g., the state 4052), are propagated throughout the system control apparatus 2000. When one of the Modules is in the error state 4052 all of the Modules will be set to the error state 4052.

As illustrated on FIG. 10C, the transitions between states of the state machine 4000 (i.e., the state of the Module_x as exemplified by execution (operation, running, etc.) of the state machine 4000) are generally as follows.

Starting with the Module_x at the UNKNOWN state (e.g., the state 4102), when a robot 100 is not present and the Module_(x+1) is at either of the STOWED 4106 and STOWED_CLEAR 4108 states, the state of the Module_x autonomously transitions to the UNKNOWN_CLEAR_TO_STOW state (e.g., the state 4104).

From the UNKNOWN_CLEAR_TO_STOW state 4104, when the Module_x achieves (e.g., reaches, becomes, etc.) a SUCCESS status, which is generally defined as receipt of the ACK signal, and the status of the Module_x includes the robot 100x in the stowed position, the state of the Module_x is directed by a command signal to transition (i.e., command-directed transitions) to STOWED (e.g., the state 4106).

From the STOWED state 4106, in a first instance, when the Module_(x-1) does not have a robot 100 present and the state of the Module_(x-1) is either of DEPLOYED 4122 or DEPLOYED_CLEAR 4124, the state of the Module_x transitions internally (i.e., autonomously transitions) to STOWED_CLEAR (e.g., the state 4108).

Returning to the state 4106, in a second instance, when the Module_X achieves the SUCCESS status via receipt of the ACK signal and the status of the Module_x indicates that the solenoid shuttle switching assembly 1530 is active (i.e., activation of the solenoid shuttle assembly 1530 is desired, an activate solenoid command signal is presented, and the like), the state of the Module_x transitions via command (i.e., command-directed transitions) to SOLENOID_ACTIVE (e.g., the state 4110).

At the SOLENOID_ACTIVE state (e.g., the state 4110), in a first instance, when the Module_x has transitioned from the STOWED state (e.g., the state 4106) and the SUCCESS includes the status of the solenoid shuttle switching assembly 1530 as inactive, the state of the Module_x internally transitions back to the STOWED state (e.g. the state 4106); and in a second instance, when the Module_x has transitioned from the STOWED_CLEAR state (e.g., the state 4108) and the SUCCESS includes the status of the solenoid shuttle switching assembly 1530 as inactive, the state of the Module_x autonomously transitions back to the STOWED_CLEAR state (e.g. the state 4108).

Returning to the state 4108, the SUCCESS condition always includes a command-directed transition to the READY_TO_DEPLOY state (e.g., the state 4120).

Similarly, from the READY_TO_DEPLOY state 4120, in one instance, the SUCCESS condition always includes a command-directed transition back to the STOWED_CLEAR state (e.g., the state 4108). In a second instance, from the READY_TO_DEPLOY state 4120, when a SUCCESS condition that includes receipt of the ACK signal and the desired (commanded) status of the Module_X is deployed 4120, the Module_x command-directed transitions to the DEPLOYED state (e.g., the state 4122).

From the DEPLOYED state 4122, when a robot 100 is not present, and the Module_(x+1) is in either of the STOWED state (e.g., the state 4106) or the STOWED_CLEAR state (e.g., the state 4108), the Module_x autonomously transitions to the DEPLOYED_CLEAR state (e.g., the state 4124).

From the DEPLOYED_CLEAR state 4124, in one instance, the SUCCESS condition always includes a command-directed transition back to the STOWED state (e.g., the state 4106). In a second instance, from the DEPLOYED_CLEAR state 4124, when a SUCCESS condition that includes receipt of the ACK signal and the desired (commanded) status of the Module_X is stowed 4106, the Module_x command-directed transitions to the READY_TO_STOW state (e.g., the state 4126).

From the READY_TO_STOW state 4126, in one instance, the SUCCESS condition always includes a command-directed transition back to the DEPLOYED_CLEAR state (e.g., the state 4124). In a second instance, from the state READY_TO_STOW 4126, when a SUCCESS condition that includes receipt of the ACK signal and the desired (commanded) status of the Module_X is stowed 4106, the Module_x command-directed transitions back to the STOWED state (e.g., the state 4106).

Figure 11:
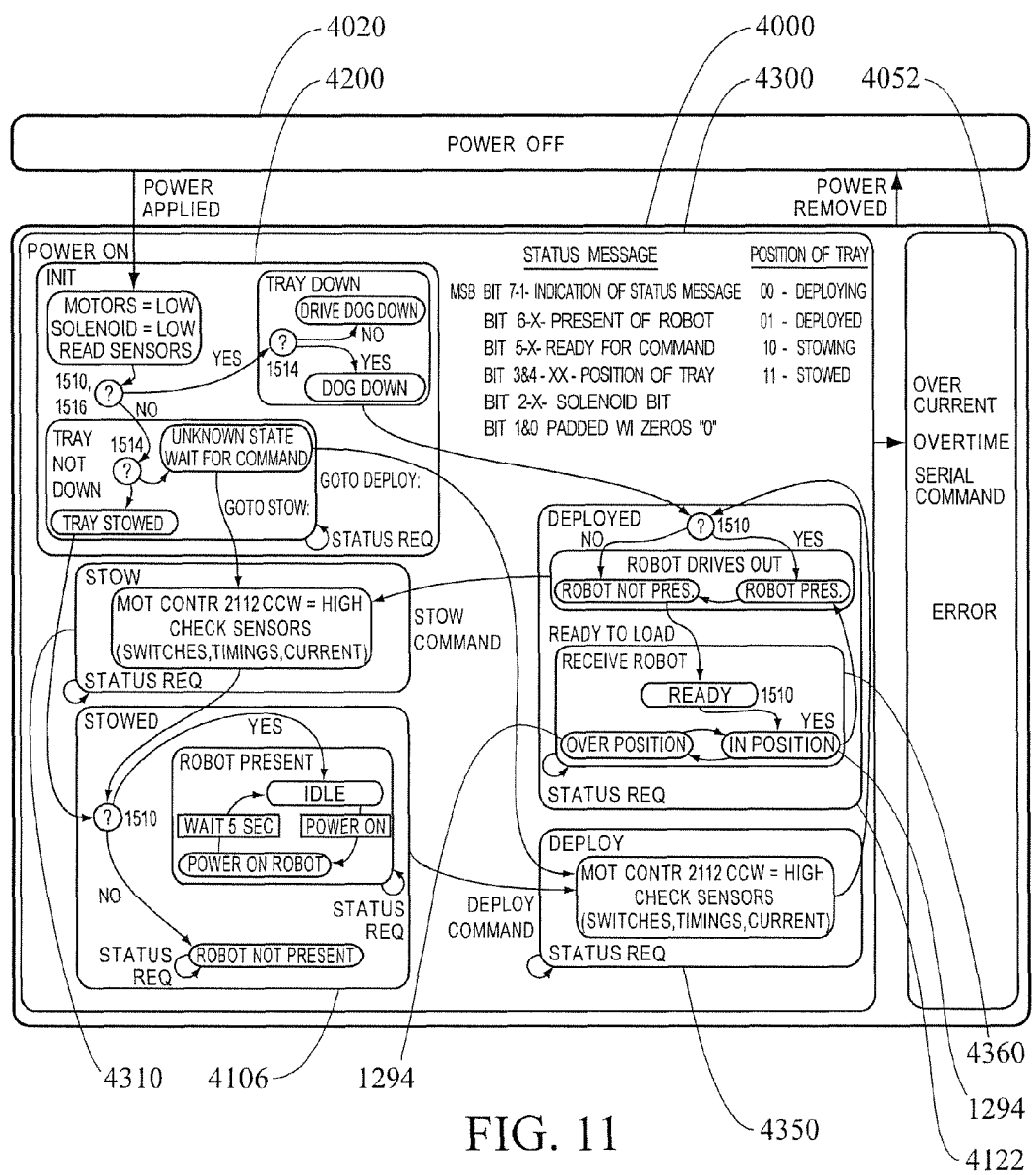
FIG. 11 is a detailed state diagram of an individual motor controller of the control apparatus of FIG. 5.

Referring to FIG. 11, a state diagram for the primary and/or secondary individual motor controller 2112 of the system control apparatus 2000 of FIG. 5 is illustrated. As described above in connection with FIGS. 6(A-B), the primary and/or secondary individual motor controller 2112x generally comprises three (3) physical devices: (i) the H-bridge motor driver, (ii) the supporting circuitry, and (iii) the microcontroller with software/firmware (e.g., status control computer programming) to perform the processes (e.g., methods, steps, blocks, state machine, routines, loops, etc.). As used herein, particularly in the context of the state diagram on FIG. 11, the terms "state(s)" and "status(es)" are generally interchangeable, and are so used in the description, as would be understood by one of ordinary skill in the art.

The microcontroller provides the capability of processing analog and digital electrical inputs and outputs. The microcontroller that includes the state machine 4000 which runs (e.g., executes, processes, etc.) status control programming (software, routine, loop, etc.) that includes an initialization (e.g., power on/off, start/stop, begin/end, and the like) routine (e.g., status 4200) and a main loop (e.g., main loop 4300). In one example, the status control programming 4300 that ensures proper handling of error conditions (e.g., the autonomous transition from the DEFAULT state (status) 4050 to the ERROR state (status) 4052 as illustrated on FIG. 10A).

The main loop 4300 procedure in the microcontroller runs (e.g., performs, operates, processes, executes, etc.) integrally as part of the state machine 4000. The main loop 4300 programming may be implemented similarly to the DEFAULT state (status) 4050 related programming. The state machine 4000 generally controls the behavior of the primary and/or secondary individual motor controller 2112. Actions are completed on the transitions as the primary and/or secondary individual motor controller 2112 passes (e.g., transitions, shifts, moves, etc.) from state to state (status to status). In general, the transitions in the state machine 4000 are triggered by either messages (e.g., commands, signals, status messages, feedback signals, and the like) from the OCU 2012, the (JAUS) signal management component 2532 in the modules supervisory controller 2110, and/or from the sensor suite 1250 (e.g., the actuators 1310 and 1340, the switches 1500, 1510, 1514 and 1516, the nose position over-run indicator 1294, and the like), or by autonomously performing computer programming routines.

The state machine 4000 comprises a power off condition 4020, the initialization state (status) 4200, the error state (status) 4052, and four states (statuses) that represent the physical configuration or pose of the module (e.g., the primary module 1102 and/or the secondary module 1104; alternatively referred to as the Module_x). The four physical configuration states (statuses) that are illustrated on FIG. 11 comprise a Stow(ing) command state (status) 4310, the Stowed state (status) 4106, a Deploy(ing) command state (status) 4350, and the Deployed state (status) 4122. As well as the processes described in detail below, the Stowing command status 4310, the Stowed status 4106, the Deploying command status 4350, and the Deployed status 4122 each include a Status Request sub-routine that substantially continuously monitors the sensor suite 1250 during the operation of the main loop 4300.

In one example, the status signal (message) may be implemented as an eight (8) bit signal having the most significant bit (MSB, bit 7)—1—Indication of status message; bit 6—X—presence of the robot 100; bit 5—X—ready for command; bits 3 and 4—XX—position of the module support tray (primary) 1230 or (one or more of the secondary) 1240; bit 2—X—solenoid assembly 5130 control bit; and bits 1 and 0—padded with zeros (e.g., 0). For bits 3 and 4, the positions of the module support tray 1230 or 1240 may be defined as: 00—deploying (e.g., the status 4350); 01—deployed (e.g., the status 4122); 10—stowing (e.g., the status 4310); and 11—stowed (e.g., the status 4106). However, the status message may be implemented having any appropriate length and defining bit pattern to meet the design criteria of a particular application.

When the primary and/or secondary individual motor controller 2112x is at the Power Off status 4020 and power is applied, the state machine 4000 is activated and the initialization status 4200 routine begins. Conversely, when the state machine 4000 is in an active condition and power to the primary and/or secondary individual motor controller 2112x is removed, the Module_x transitions to the Power Off status 4020.

At the initialization status 4200, the state machine 4000 checks (e.g., reviews, determines, assesses, and the like) the status of all the limit/position switches (e.g., the switches 1500, 1510, 1514, and 1516) in the sensor suite 1250x of the Module_x. The three outcomes of the switch status check process are the Module_x is in (i) the stowed position (e.g., the status 4106), (ii) the deployed position (e.g., the status 4122), or (iii) the unknown condition (e.g., the status 4102).

When the primary and/or secondary individual motor controller 2112 is in a known configuration (e.g., not at the unknown status 4102), the state machine 4000 will automatically (autonomously) transition to the determined status of the Module_x.

When the primary and/or secondary individual motor controller 2112 is at the unknown status 4102, the individual motor controller 2112 will wait for input from the (JAUS) signal management component 2532 that resides in the modules supervisory controller 2110. The input (e.g., command signal) from the signal management component 2532 generally directs the primary and/or secondary individual motor controller 2112 to either stow or deploy the Module_x.

In the Stow status (e.g., the command state 4310), the primary and/or secondary individual motor controller 2112 changes the pose of the Module_x from a deployed configuration (e.g., the status 4122) to a stowed configuration (e.g., the status 4106). During transition from the status 4122 to the status 4106, the primary and/or secondary individual motor controller 2112 activates the appropriate actuator (e.g., the actuator 1310, and/or the actuator 1340) via the H-bridge amplifier noted above.

The main loop 4300 generally operates (e.g., performs, executes, processes, controls, etc.) as follows.

While the linear actuator(s) (lifting) 1310 and/or (clamping) 1340 are active (power on mode), the microcontroller in the primary and/or secondary individual motor controller 2112x monitors the current draw of the linear actuator(s) 1310 and/or 1340. When the monitored current exceeds a predetermined current limit for the particular operation and configuration (status), the linear actuator (lifting) 1310 and/or (clamping) 1340 is shutdown (stopped) and the Module_x enters the error condition (e.g., the status 4052).

When the linear actuator 1310 and/or 1340 does not draw excessive current, the Module_x will complete the requested transition when the clamping dog limit switch 1514 is activated. At that time, the state machine 4000 transitions to the Stowed state (status) (e.g., the status 4106).

The primary and/or secondary individual motor controller 2112x tracks (measures, determines, etc.) the time to completion for the transition to the Stowed status. When the clamping dog limit switch 1514 is not activated within a predetermined window of time (time frame), the Module_x will also transition into the error condition (e.g., the status 4052).

Referring to the status 4106: the Stowed status 4106 (i.e., physical positioning of the robot 100 in the Module_x during the stowed status 4106) provides the User the capability such that the solenoid shuttle switching assembly 1530 that is mounted in the Module_x can be actuated to change (e.g., toggle) the power state of the robot 100. When the robot 100 internal power is on, the solenoid shuttle switching assembly 1530 can be used to power off the robot 100. Likewise, when the robot 100 internal power is off, the solenoid shuttle switching assembly 1530 can be used to turn the robot 100 on. The maximum cycle time (e.g., less than 5 seconds) of the solenoid shuttle switching assembly 1530 is predetermined (e.g., programmed into the software of the microcontroller of the primary and/or secondary individual motor controller 2112). The microcontroller portion of the primary and/or secondary individual motor controller 2112 tracks (e.g., monitors) the operations of the solenoid shuttle switching assembly 1530 to ensure that a violation (too short or too long duration) of cycle time does not occur.

When in the stowed state 4106, the primary and/or secondary individual motor controller 2112x may also receive the deploy command that is presented by the JAUS signal management component 2532. When the Deploy command is received, the primary and/or secondary individual motor controller 2112x (i.e., the state machine 4000) transitions to the Deploy state (e.g., the state 4350).

Referring to the status 4350, during the Deploy status 4350, the primary and/or secondary individual motor controller 2112 controls the lowering of the module support tray 1230 or 1240 of the Module_x to the deployed position (or pose) 4122 via the lifting linear actuator 1310. While the module support tray 1230 or 1240 is being lowered, the microcontroller of the primary and/or secondary individual motor controller 2112 monitors the current draw of the lifting linear actuator 1310 (in the sensor suite 1250x).

When the lifting linear actuator 1310 draws more current than the set limit allowed in the present configuration (i.e., excessive current is drawn), the Module_x (i.e., the state machine 4000) transitions to the error status 4052. When the lifting linear actuator 1310 lowers the module support tray 1230 or 1240, and the lifting linear actuator 1310 current does not violate the predetermined limit; after the tray position switch 1500 in the case of the primary module 1102 and switch 1516 in the case of the secondary module 1104 is depressed, the Module_x (i.e., the state machine 4000) transitions to the Deployed status 4122.

The transition to the deployed status 4122 is also timed by the primary and/or secondary individual motor controller 2112. When the tray position switch 1500 or 1516 is not depressed within the allowable (predetermined) window of time (e.g., the lifting linear actuator 1310 operates longer than 15 seconds), the Module_x (i.e., the state machine 4000) will transition to the error status 4052.

Referring to the status 4122, there are two main operations (e.g., tasks, procedures, oops, routines, and the like) that can be performed during the Deployed status 4122: (i) the loading (e.g., extraction) procedure, and (ii) a module stowing procedure (i.e., rotation of the Module_x to the vertical position whether or not a robot 100 is present on the module support tray (primary) 1230 or (secondary) 1240. When there is no robot 100 on the tray, the JAUS signal management component 2532 may invoke (initiate) the robot 100 loading procedure.

When the primary and/or secondary individual motor controller 2112 receives a load request (command) from the (JAUS) signal management component 2532, the state machine 4000 transitions to a Receive Robot status (e.g., a status 4360) that is located within (e.g., is a sub-status to) the Deployed status 4122.

During the time that the Module_x is at the receive robot status 4360, the primary and/or secondary individual motor controller 2112 initially provides an indication (e.g., status signal) to the User that the Module_x is ready to receive a robot 100 via illumination of the green indicator LED (i.e., the first visual indicator) 1290 on the Module_x. While the User is maneuvering the robot 100 into the correct position for loading, the primary and/or secondary individual motor controller 2112 monitors the "robot present" (nose position limit) switch 1510 that is located in the module support tray 1230 or 1240 of the Module_x.

When the nose position limit switch 1510 is depressed, the individual motor controller 1510 will illuminate the red indicator LED (e.g., the second visual indicator) 1292 to provide the User an indication that the robot 100 may be in the correct position for stowing. To ensure that the robot 100 is not driven too far into the Module_x, an optical sensor (e.g., the nose position over-run indicator 1294) laterally scans the region of the Module_x near the correct position of the nose 120 and determines the depth (amount) of longitudinal entry of the robot 100 into the Module_x. When the optical position sensor 1294 determines that an obstruction is present, the obstruction is assumed to be the robot 100, and the primary and/or secondary individual motor controller 2112 will present the signal to slowly flash (e.g., flash at a rate in the range of 1-2 flashes per second or less) the red indicator LED (e.g., the second visual indicator) 1292.

The slow flashing illumination (blink) of the second visual indicator 1292 provides the User an indication that the robot 100 is likely out of proper position for loading. When the User corrects the depth of the robot 100 (e.g., backs the robot 100 to a proper longitudinal location), the nose position over-run indicator 1294 will provide a signal indicating that the robot 100 is in the correct position, and the red LED (e.g., the second visual indicator) 1292 will cease to blink and remain solidly lit. When the robot 100 is held (maintained) in the correct position for a short period of time (e.g., more than 20 seconds), the primary and/or secondary individual motor controller 2112 (i.e., the state machine 4000) will exit (transition from) the receive robot state 4360 and return (transition) to the Deployed status 4122.

Prior to transition of the Module_x to the stowed status 4106, the primary and/or secondary individual motor controller 2112 (e.g., the state machine 4000) generally determines whether the Module_x is clear to raise the module support tray (primary) 1230 or (secondary) 1240. The nose position over-run indicator 1294 laterally scans the region of the Module_x near the correct position of the nose 120, and determines whether or not an obstruction is present.

When the nose position over-run indicator 1294 determines that an obstruction is present, the individual motor controller 2112 will not perform the stowing procedure (i.e., the state machine 4000 will refrain from transitioning to the stowed status 4106). The primary and/or secondary individual motor controller 2112 also indicates that an obstruction has been determined by negatively acknowledging the stow command (i.e., the NAK signal is presented) to the JAUS signal management component 2532. Furthermore, the primary and/or secondary individual motor controller 2112 indicates that the obstruction condition to the operator (i.e., the User) by rapidly flashing illumination (i.e., flashing at a rate of greater than 2 flashes per second) of the red indicator LED (i.e., the second visual indicator 1292) that is on the Module_x.

When the optical sensor (i.e., the nose position over-run indicator 1294) does not sense an obstruction, the Module_x (i.e., the state machine 4000) is transitioned to the Stow status (e.g., the status 4106), and the module support tray (primary) 1230 or (secondary) 1240 is stowed.

When the Module_x has a fault or error event while operating (i.e., an over current, over time, and the like condition occurs), the Module_x transitions to the error status 4052 in the state machine 4000. On the transition to the error status 4052, a control signal is sent to the H-bridge to stop the lifting motor actuator 1310. The signal management component 2532 is informed of the error condition via a message (e.g., status signal) over (via) the serial communication link 2130. The reason (e.g., cause) of the error is noted (determined) and binned into (e.g., classified, categorized, entered into, and the like) a predefined category (e.g., over current, excessive time, obstruction, robot over travel, etc.).

During the time that Module_x is in the error status 4052, the red and green indicator LEDs (i.e., the first visual indicator 1290 and the second visual indicator 1292) flash the binary code corresponding to the error category of the Module_x that has been encountered. The first visual indicator 1290 and the second visual indicator 1292, thereby, may indicate the particular error state to the operator (User) so that correction may be made.

As is apparent then from the above detailed description, the present invention may provide an improved apparatus (e.g., the system control apparatus 2000) and an improved method (e.g., the method or process 4000) for systematic control of robotic deployment, extraction, and stowage.

Various alterations and modifications will become apparent to those skilled in the art without departing from the scope and spirit of this invention and it is understood this invention is limited only by the following claims.

What is claimed is:

1. A system control apparatus (2000) for systematic control of (i) extraction of a vehicle (100) from an environment, (ii) stowage of the vehicle in a modular handling and stowage system (1000), the system having a primary module (1102) and zero or more secondary modules (1104*a*-1104*n*), wherein the secondary modules are serially, mechanically coupled to the primary module and together, and (iii) deployment of the vehicle from the module group in response to command signals, sensor signals, and status signals, the system control apparatus comprising:

an operator control unit OCU (2012) operated by a User, wherein the OCU generates the command signals as directed by the User, and receives the sensor signals and the status signals;

a modules supervisory controller (2110), a primary individual motor controller (2112_PM), and a primary module sensor suite (1250_PM), wherein, the modules supervisory controller (2110), the primary individual motor controller, and the primary module sensor suite are included in the primary module, wherein, the primary individual motor controller (2112_PM) is electrically coupled to the modules supervisory controller, and the modules supervisory controller and the primary module sensor suite are electrically coupled to the OCU, and the modules supervisory controller (2110) receives the command signals, the sensor signals and the status signals, the primary individual motor controller (2112_PM) generates one or more of the status signals and receives the command signals, and the primary module sensor suite generates and presents one or more of the sensor signals; and a secondary individual motor controller (2112*a*-2112-*n*) and a secondary module sensor suite (1250*a*-1250*n*) that are included in each of the zero or more secondary modules, wherein each of the zero or more secondary modules are electrically coupled to the primary individual motor controller (2112_PM), the secondary individual motor controller (2112*a*-2112-*n*) generates one or more of the status signals and receives the command signals, and the secondary module sensor suite generates and presents one or more of the sensor signals; wherein, the modules supervisory controller (2110) having a microcontroller that includes state control programming configured as a state machine (4000) to control operation of the primary and the secondary module controllers and the primary and the secondary sensor suites with respect to transition between states, the states including:

UNKNOWN (4102); UNKNOWN_CLEAR_TO_STOW (4104); STOWED (4106); STOWED_CLEAR (4108); SOLENOID_ACTIVE (4110); READY_TO_DEPLOY (4120); DEPLOYED (4122); DEPLOYED_CLEAR (4124); and READY_TO_STOW (4126);

wherein, an acknowledgment status signal (ACK) indicates proper receipt of one of the command signals, a non-acknowledgment status signal (NAK) indicates failure to receive one of the command signals, and a SUCCESS condition for the state machine (4000) is defined as receipt of the status signal ACK;

wherein the transition between the states comprises:

starting with one of the primary and the secondary modules at the UNKNOWN state (4102), when the vehicle (100) is not present and the one of the primary and the secondary modules is at either of the STOWED and STOWED_CLEAR states, the state of the one of the primary and the secondary modules autonomously transitions to the UNKNOWN_CLEAR_TO_STOW state (4104);

from the UNKNOWN_CLEAR_TO_STOW state (4104), when the one of the primary and the secondary modules achieves a SUCCESS condition that is defined as receipt of the signal ACK and includes one of the primary and the secondary modules the vehicle (100) in the stowed position, the state of the one of the primary and the secondary modules command-directed transitions to the STOWED state (4106);

from the STOWED state (4106), when a second of the primary and the secondary modules which is mechanically coupled immediately, serially lower to the one of the primary and the secondary modules does not have the vehicle (100) present and the state of the second of the primary and the secondary modules is either of DEPLOYED state or DEPLOYED_CLEAR state, the state of the one of the primary and the secondary modules autonomously transitions to the STOWED_CLEAR state (4108);

from the state (4108), the SUCCESS condition always includes a command-directed transition to the READY_TO_DEPLOY state (4120);

from the READY_TO_DEPLOY state (4120), the SUCCESS condition always includes a command-directed transition back to the STOWED_CLEAR state (4108), and, from the READY_TO_DEPLOY state (4120), when a SUCCESS condition that includes receipt of the ACK signal and the commanded status of the one of the primary and the secondary modules is the DEPLOYED state, the one of the primary and the secondary modules command-directed transitions to the DEPLOYED state (4122);

from the DEPLOYED state (4122), when the vehicle (100) is not present, and the second of the secondary modules which is mechanically coupled immediately, serially higher to the one of the primary and the secondary modules is in either of the STOWED state (4106) or the STOWED_CLEAR state (4108), the one of the primary and the secondary modules autonomously transitions to the DEPLOYED_CLEAR state (4124);

from the DEPLOYED_CLEAR state (4124), the SUCCESS condition always includes a command-directed transition back to the STOWED state (4106), and, from the DEPLOYED_CLEAR state (4124), when a SUCCESS condition that includes receipt of the ACK signal and the command-directed state of the one of the primary and the secondary modules is the STOWED state (4106), the one of the primary and the secondary modules command-directed transitions to the READY_TO_STOW state (4126); and from the READY_TO_STOW state (4126), the SUCCESS condition always includes a command-directed transition back to the DEPLOYED_CLEAR state (4124), and, from the READY_TO_STOW state (4126), when the SUCCESS condition includes receipt of the ACK signal and the command-directed state of the one of the primary and the secondary modules is the STOWED state (4106), the one of the primary and the secondary modules command-directed transitions back to the STOWED state (4106).

2. The system control apparatus of claim 1, wherein, each of the primary and the secondary modules further comprises a solenoid shuttle switching assembly (1530) having an active state or an inactive state, and the transition between the states further comprises:

returning to the STOWED state (4106), when the one of the primary and the secondary modules achieves the SUCCESS state via receipt of the ACK signal, and an activate solenoid command signal is presented, the one of the primary and the secondary modules command-directed transitions to the SOLENOID_ACTIVE state (4110); and from the SOLENOID_ACTIVE state (4110), when the one of the primary and the secondary modules has transitioned from the STOWED state (4106) and the SUCCESS state of the one of the primary and the secondary modules includes the solenoid shuttle switching assembly (1530) at the inactive state, the one of the primary and the secondary modules autonomously transitions back to the STOWED state (4106); and, when the one of the primary and the secondary modules has transitioned from the STOWED_CLEAR state (4108) and the SUCCESS state of the one of the primary and the secondary modules includes the solenoid shuttle switching assembly (1530) at the inactive state, the state of the one of the primary and the secondary modules autonomously transitions back to the STOWED_CLEAR state (4108).

3. A system control apparatus (2000) for systematic control of extraction of a vehicle (100) from an environment,
   stowage of the vehicle in a modular handling and stowage system (1000) having a primary module (1102) and zero or more secondary modules (1104a-1104n) that are serially, mechanically coupled together,
   and deployment of the vehicle from the module group in response to command signals, sensor signals, and status signals, the system control apparatus comprising:
   an operator control unit OCU (2012) operated by a User, wherein the OCU generates the command signals as directed by the User, and receives the sensor signals and the status signals;
   a modules supervisory controller (2110), a primary individual motor controller (2112_PM), and a primary module sensor suite (1250_PM), wherein, the modules supervisory controller (2110), the primary individual motor controller, and the primary module sensor suite are included in the primary module, wherein,
   the primary individual motor controller (2112_PM) is electrically coupled to the modules supervisory controller, and the modules supervisory controller and the primary module sensor suite are electrically coupled to the OCU, and
   the modules supervisory controller (2110) receives the command signals, the sensor signals and the status signals,
   the primary individual motor controller (2112_PM) generates one or more of the status signals and receives the command signals,
   and the primary module sensor suite generates and presents one or more of the sensor signals; and
   a secondary individual motor controller (2112a-2112-n) and a secondary module sensor suite (1250a-1250n) that are included in each of the zero or more secondary modules, wherein each of the zero or more secondary modules are electrically coupled to the primary individual motor controller (2112_PM),
   the secondary individual motor controller generates one or more of the status signals and receives the command signals, and
   the secondary module sensor suite generates and presents one or more of the sensor signals; wherein,
     the modules supervisory controller (2110) having a microcontroller that comprises a state machine (4000) that further comprises timing control programming (5000) configured to control operation of the primary and the secondary module controllers and the primary and the secondary sensor suites, wherein, the modules supervisory controller (2110) further comprises (i) a main process (2520), and (ii) a component manager process (2522); wherein, the operation of the primary and the secondary module controllers and the primary and the secondary sensor suites comprises the steps:
     (5010) starting the component manager process (2522), wherein, the component manager process (2522) manages the command signals, the sensor signals, and the status signals for the modules supervisory controller (2110); and after the component manager process (2522) is running, starting the main process (2520), and connecting the main process (2520) to the component manager process (2522), thereby providing capability for the main process (2520) to send and receive the command signals, the sensor signals, and the status signals;
     (5012) after the main process (2520) is started, (5020) creating a module manager (2526), wherein, the module manager (2526), (5024) detects attachment and/or detachment of the primary and/or secondary individual motor controllers (2112), and (5026) generates one or more of the status signals that indicate when attachment and/or detachment of the primary and/or secondary individual motor controllers has occurred;
     (5030) creating the component manager process (2522) for each of the primary and/or secondary individual motor controllers (2112), wherein, the component manager process (2522) manages all of the signal management components (2532), and the module manager (2526) and the component manager process (2522) manage the command signals;
     after creation of the module manager (2526) and the component manager process (2522), (5032) registering the component manager process (2522) to the module manager (2526) to enable reception of the status signals that indicate attachment and/or detachment of the primary and/or secondary individual motor controllers (2112);
     (5034) creating a signal management component (2532) for each of the secondary module (1104) that is attached, and deleting the signal management component (2532) as each of the secondary modules (1104) is detached, wherein, the signal management component (2532) presents the status signals to and receives the status signals from the primary and/or secondary individual motor controllers (2112), and maintains a state for the primary and/or secondary individual motor controllers (2112);
     (5042) after a predetermined period of time has elapsed, locking in a base configuration of the primary module (1102) and the zero or more secondary modules (1104), and (5044) registering services within the component manager process (2522), wherein, the base configuration comprises which of the secondary modules (1104) are present and are adjacent to one another;
     activating the component manager process (2522); and
     starting a periodic main loop (5100), wherein the main loop (5100) continues until the component manager process (2522) is stopped.

4. The system control apparatus of claim 3, wherein, the activating the component manager process (2522) comprises:
   checking the system control apparatus (2000) for module continuity; and when there are gaps between the primary module and the secondary modules, and between adjacent secondary modules, setting a failure condition;
   within each of the primary module and the zero of more secondary modules, performing a communications check between the component manager process (2532) and the primary and/or secondary individual motor controllers (2112);
   determining the state for each of the primary module and the zero of more secondary modules, and the state of the modules adjacent thereto; and providing control of the primary and/or secondary modules via the OCU.

5. The system control apparatus of claim 4, wherein, the main loop (5100) further comprises:
  (i) checking safety (5110); and
  (ii) repeating the determining the state for each of the primary module and the zero of more secondary modules.

6. The system control apparatus of claim 5, wherein, the checking safety (5110) comprises:
  determining whether any of the signal management components (2532) is at the failure condition;
  determining when the system control apparatus (2000) varies from the base configuration, and when the system control apparatus (2000) varies from the base configuration, setting the failure condition;
  determining when communications has been lost to any of the primary and/or secondary individual motor controllers (2112), and when communications has been lost to any of the primary and/or secondary individual motor controllers (2112), setting the failure condition;
  presenting the failure condition status to all of the signal management components (2532), and entering the system control apparatus (2000) into the failure condition; and
  resetting to recover the system control apparatus (2000) from the failure condition.

7. A system control apparatus (2000) for systematic control of (i) extraction of a vehicle (100) from an environment, (ii) stowage of the vehicle in a modular handling and stowage system (1000), the system having a primary module (1102) and zero or more secondary modules (1104a-1104n), wherein the secondary modules are serially, mechanically coupled to the primary module and together, and (iii) deployment of the vehicle from the module group in response to command signals, sensor signals, and status signals, the system control apparatus comprising:
  an operator control unit OCU (2012) operated by a User, wherein the OCU generates the command signals as directed by the User, and receives the sensor signals and the status signals;
  a modules supervisory controller (2110), a primary individual motor controller) (2112_PM, and a primary module sensor suite (1250_PM), wherein, the modules supervisory controller (2110), the primary individual motor controller, and the primary module sensor suite are included in the primary module, wherein,
  the primary individual motor controller (2112_PM) is electrically coupled to the modules supervisory controller, and the modules supervisory controller and the primary module sensor suite are electrically coupled to the OCU, and
  the modules supervisory controller (2110) receives the command signals, the sensor signals and the status signals,
  the primary individual motor controller (2112_PM) generates one or more of the status signals and receives the command signals, and controls one or more primary actuators, and the primary module sensor suite generates and presents one or more of the sensor signals; and
  a secondary individual motor controller (2112a-2112-n) and a secondary module sensor suite (1250a-1250n) that are included in each of the zero or more secondary modules, wherein each of the zero or more secondary modules are electrically coupled to the primary individual motor controller (2112_PM), the secondary individual motor controller (2112a-2112-n) generates one or more of the status signals and receives the command signals, and each of the secondary individual motor controllers controls a secondary actuator, and
the secondary module sensor suite generates and presents one or more of the sensor signals; wherein,
the modules supervisory controller (2110) having a microcontroller that includes status control programming configured as a state machine (4000) to control operation of the primary and the secondary module controllers and the primary and the secondary sensor suites with respect to transition between statuses, the statuses including:
POWER_OFF (4020); ERROR (4052); UNKNOWN (4102); UNKNOWN_CLEAR_TO_STOW (4104); STOWED (4106); STOWED_CLEAR (4108); SOLENOID_ACTIVE (4110); READY_TO_DEPLOY (4120); DEPLOYED (4122); DEPLOYED_CLEAR (4124); READY_TO_STOW (4126); INITIALIZATION (4200); MAIN LOOP (4300); STOWING (4310); DEPLOYING (4350); RECEIVE_VEHICLE (4360);
wherein, the transition between the statuses comprises:
  when the state machine (4000) is at the POWER_OFF status (4020) and power is applied, the state machine (4000) is activated and the INITIALIZATION status (4200) begins;
  when, conversely, the state machine (4000) is in an active condition and power is removed, the state machine (4000) autonomously transitions to the POWER_OFF status (4020); and
  at the INITIALIZATION status (4200), the state machine (4000), in response to the sensor signals, determines the status of all of the primary and/or zero or more secondary modules,
  when the primary and/or zero or more secondary module is at the UNKNOWN status (4102), the state machine autonomously transitions to the MAIN_LOOP status (4300), and command-directed transitions to the STOWED status (4106) in response to a stow command, or to the DEPLOYED status (4122) in response to a deploy command signal.

8. The system control apparatus of claim 7, wherein, when the state machine (4000) is in the STOWING status (4310) or the DEPLOYING status (4350), the state machine (4000) monitors the sensor signals, and when one or more of the sensor signals exceeds a predetermined limit, the state machine (4000) autonomously transitions to the ERROR status (4052), and stops the one or more primary actuators or the secondary actuator.

9. The system control apparatus of claim 7, wherein, each of the primary and the secondary modules further comprises a solenoid shuttle switching assembly (1530) having the SOLENOID_ACTIVE status (4110) when power is applied to the solenoid shuttle switching assembly (1530), and the transition between the statuses further comprises:
  when the state machine is in the STOWED state (4106), the state machine command-directed transitions to the SOLENOID_ACTIVE status (4110) in response to a an activate solenoid command signal.

10. The system control apparatus of claim 8, wherein, when the state machine (4000) is at the STOWED status (4106), when the deploy command is received, the state machine command-directed transitions to the DEPLOYING status (4350), and autonomously transitions from the DEPLOYING status (4350) to the DEPLOYED status (4122).

11. The system control apparatus of claim 8, wherein, when the state machine (4000) is at the DEPLOYED status (4122), when the stow command signal is received, the state machine (4000) command-directed transitions to the STOWING status (4310), and autonomously transitions from the DEPLOYING status (4350) to the STOWED status (4106).

12. A method for systematic control of (i) extraction of a vehicle (100) from an environment, (ii) stowage of the vehicle in a modular handling and stowage system (1000), the system having a primary module (1102) and zero or more secondary modules (1104*a*-1104*n*), wherein the secondary modules are serially, mechanically coupled to the primary module and together, and (iii) deployment of the vehicle from the module group in response to command signals, sensor signals, and status signals, wherein, the system comprises a system control apparatus (2000), the system control apparatus comprising:

an operator control unit OCU (2012) operated by a User, wherein the OCU generates the command signals as directed by the User, and receives the sensor signals and the status signals;

a modules supervisory controller (2110), a primary individual motor controller (2112_PM), and a primary module sensor suite (1250_PM), wherein, the modules supervisory controller (2110), the primary individual motor controller, and the primary module sensor suite are included in the primary module, wherein, the primary individual motor controller (2112_PM) is electrically coupled to the modules supervisory controller, and the modules supervisory controller and the primary module sensor suite are electrically coupled to the OCU, and the modules supervisory controller (2110) receives the command signals, the sensor signals and the status signals, the primary individual motor controller (2112_PM) generates one or more of the status signals and receives the command signals, and the primary module sensor suite generates and presents one or more of the sensor signals; and a secondary individual motor controller (2112*a*-2112-*n*) and a secondary module sensor suite (1250*a*-1250*n*) that are included in each of the zero or more secondary modules, wherein each of the zero or more secondary modules are electrically coupled to the primary individual motor controller (2112_PM), the secondary individual motor controller (2112*a*-2112-*n*) generates one or more of the status signals and receives the command signals, and the secondary module sensor suite generates and presents one or more of the sensor signals; wherein, the modules supervisory controller (2110) having a microcontroller that includes state control programming configured as a state machine (4000) to control operation of the primary and the secondary module controllers and the primary and the secondary sensor suites with respect to transition between states, the states including:

UNKNOWN (4102); UNKNOWN_CLEAR_TO_STOW (4104); STOWED (4106); STOWED_CLEAR (4108); SOLENOID_ACTIVE (4110); READY_TO_(4120); DEPLOYED (4122); DEPLOYED_CLEAR (4124); and READY_TO_STOW (4126);

wherein, an acknowledgment status signal (ACK) indicates proper receipt of one of the command signals, a non-acknowledgment status signal (NAK) indicates failure to receive one of the command signals, and a SUCCESS condition for the state machine (4000) is defined as receipt of the status signal ACK;

wherein, the method comprises:

starting with one of the primary and the secondary modules at the UNKNOWN state (4102), when the vehicle (100) is not present and the one of the primary and the secondary modules is at either of the STOWED and STOWED_CLEAR states, the state of the one of the primary and the secondary modules autonomously transitioning to the UNKNOWN_CLEAR_TO_STOW state (4104);

from the UNKNOWN_CLEAR_TO_STOW state (4104), when the one of the primary and the secondary modules achieves a SUCCESS condition that is defined as receiving the signal ACK and includes having one of the primary and the secondary modules the vehicle (100) in the stowed position, the state of the one of the primary and the secondary modules command-directed transitioning to the STOWED state (4106);

from the STOWED state (4106), when a second of the primary and the secondary modules which is mechanically coupled immediately, serially lower to the one of the primary and the secondary modules not having the vehicle (100) present and the state of the second of the primary and the secondary modules is either of DEPLOYED state or DEPLOYED_CLEAR state, the state of the one of the primary and the secondary modules autonomously transitioning to the STOWED_CLEAR state (4108);

from the state (4108), the SUCCESS condition always including command-directed transitioning to the READY_TO_DEPLOY state (4120);

from the READY_TO_DEPLOY state (4120), the SUCCESS condition always including command-directed transitioning back to the STOWED_CLEAR state (4108), and, from the READY_TO_DEPLOY state (4120), when a SUCCESS condition that includes receiving the ACK signal and the commanded status of the one of the primary and the secondary modules is the DEPLOYED state, the one of the primary and the secondary modules command-directed transitioning to the DEPLOYED state (4122);

from the DEPLOYED state (4122), when the vehicle (100) is not present, and the second of the secondary modules which is mechanically coupled immediately, serially higher to the one of the primary and the secondary modules is in either of the STOWED state (4106) or the STOWED_CLEAR state (4108), the one of the primary and the secondary modules autonomously transitioning to the DEPLOYED_CLEAR state (4124);

from the DEPLOYED_CLEAR state (4124), the SUCCESS condition always including command-directed transitioning back to the STOWED state (4106), and, from the DEPLOYED_CLEAR state (4124), when a SUCCESS condition that includes receiving the ACK signal and the command-directed state of the one of the primary and the secondary modules is the STOWED state (4106), the one of the primary and the secondary modules command-directed transitioning to the READY_TO_STOW state (4126); and from the READY_TO_STOW state (4126), the SUCCESS condition always including command-directed transitioning back to the DEPLOYED_CLEAR state (4124), and, from the READY_TO_STOW state (4126), when the SUCCESS condition includes receiving the ACK signal and the command-directed state of the one of the primary and the secondary modules is the STOWED state (4106), the one of the primary and the secondary modules command-directed transitioning back to the STOWED state (4106).

13. The method of claim 12, wherein, each of the primary and the secondary modules further comprises a solenoid shuttle switching assembly (1530) having an active state or an inactive state, and the transitioning between the states further comprising:

returning to the STOWED state (4106), when the one of the primary and the secondary modules achieves the SUCCESS state via receiving the ACK signal, and an activate solenoid command signal is presented, the one of the primary and the secondary modules command-directed transitioning to the SOLENOID_ACTIVE state (4110); and from the SOLENOID_ACTIVE state (4110), when the one of the primary and the secondary modules has transitioned from the STOWED state (4106) and the SUCCESS state of the one of the primary and the secondary modules includes the solenoid shuttle switching assembly (1530) at the inactive state, the one of the primary and the secondary modules autonomously transitioning back to the STOWED state (4106); and, when the one of the primary and the secondary modules has transitioned from the STOWED_CLEAR state (4108) and the SUCCESS state of the one of the primary and the secondary modules includes the solenoid shuttle switching assembly (1530) at the inactive state, the state of the one of the primary and the secondary modules autonomously transitioning back to the STOWED_CLEAR state (4108).

14. A method for systematic control of extraction of a vehicle (100) from an environment, stowage of the vehicle in a modular handling and stowage system (1000) having a primary module (1102) and zero or more secondary modules (1104*a*-1104*n*) that are serially, mechanically coupled together, and deployment of the vehicle from the module group in response to command signals, sensor signals, and status signals, wherein the system comprises a system control apparatus (2000), the system control apparatus comprises:

an operator control unit OCU (2012) operated by a User, wherein the OCU generates the command signals as directed by the User, and receives the sensor signals and the status signals;

a modules supervisory controller (2110), a primary individual motor controller (2112_PM), and a primary module sensor suite (1250_PM), wherein, the modules supervisory controller (2110), the primary individual motor controller, and the primary module sensor suite are included in the primary module, wherein, the primary individual motor controller (2112_PM) is electrically coupled to the modules supervisory controller, and the modules supervisory controller and the primary module sensor suite are electrically coupled to the OCU, and the modules supervisory controller (2110) receives the command signals, the sensor signals and the status signals, the primary individual motor controller (2112_PM) generates one or more of the status signals and receives the command signals, and the primary module sensor suite generates and presents one or more of the sensor signals; and a secondary individual motor controller (2112*a*-2112-*n*) and a secondary module sensor suite (1250*a*-1250*n*) that are included in each of the zero or more secondary modules, wherein each of the zero or more secondary modules are electrically coupled to the primary individual motor controller (2112_PM), the secondary individual motor controller generates one or more of the status signals and receives the command signals, and the secondary module sensor suite generates and presents one or more of the sensor signals; wherein, the modules supervisory controller (2110) having a microcontroller that comprises a state machine (4000) that further comprises timing control programming (5000) configured to control operation of the primary and the secondary module controllers and the primary and the secondary sensor suites, wherein, the modules supervisory controller (2110) further comprises (i) a main process (2520), and (ii) a component manager process (2522); wherein, the method comprising the steps:

(5010) starting the component manager process (2522), wherein, the component manager process (2522) manages the command signals, the sensor signals, and the status signals for the modules supervisory controller (2110); and after the component manager process (2522) is running, starting the main process (2520), and connecting the main process (2520) to the component manager process (2522), thereby providing capability for the main process (2520) to send and receive the command signals, the sensor signals, and the status signals;

(5012) after the main process (2520) is started, (5020) creating a module manager (2526), wherein, the module manager (2526), (5024) detects attachment and/or detachment of the primary and/or secondary individual motor controllers (2112), and (5026) generates one or more of the status signals that indicate when attachment and/or detachment of the primary and/or secondary individual motor controllers has occurred;

(5030) creating the component manager process (2522) for each of the primary and/or secondary individual motor controllers (2112), wherein, the component manager process (2522) manages all of the signal management components (2532), and the module manager (2526) and the component manager process (2522) manage the command signals;

after creation of the module manager (2526) and the component manager process (2522), (5032) registering the component manager process (2522) to the module manager (2526) to enable reception of the status signals that indicate attachment and/or detachment of the primary and/or secondary individual motor controllers (2112);

(5034) creating a signal management component (2532) for each of the secondary module (1104) that is attached, and deleting the signal management component (2532) as each of the secondary modules (1104) is detached, wherein, the signal management component (2532) presents the status signals to and receives the status signals from the primary and/or secondary individual motor controllers (2112), and maintains a state for the primary and/or secondary individual motor controllers (2112);

(5042) after a predetermined period of time has elapsed, locking in a base configuration of the primary module (1102) and the zero or more secondary modules (1104), and (5044) registering services within the component manager process (2522), wherein, the base configuration comprises which of the secondary modules (1104) are present and are adjacent to one another;

activating the component manager process (2522); and starting a periodic main loop (5100), wherein the main loop (5100) continues until the component manager process (2522) is stopped.

15. The method of claim 14, wherein, the activating the component manager process (2522) comprises:

checking the system control apparatus (2000) for module continuity; and when there are gaps between the primary module and the secondary modules, and between adjacent secondary modules, setting a failure condition;

within each of the primary module and the zero of more secondary modules, performing a communications check between the component manager process (2532) and the primary and/or secondary individual motor controllers (2112);

determining the state for each of the primary module and the zero of more secondary modules, and the state of the modules adjacent thereto; and providing control of the primary and/or secondary modules via the OCU.

16. The method of claim 15, wherein, the main loop (5100) further comprising:

(i) checking safety (5110); and
(ii) repeating the determining the state for each of the primary module and the zero of more secondary modules.

17. The method of claim 16, wherein, the checking safety (5110) comprising:

determining whether any of the signal management components (2532) is at the failure condition;

determining when the system control apparatus (2000) varies from the base configuration, and when the system control apparatus (2000) varies from the base configuration, setting the failure condition;

determining when communications has been lost to any of the primary and/or secondary individual motor controllers (2112), and when communications has been lost to any of the primary and/or secondary individual motor controllers (2112), setting the failure condition;

presenting the failure condition status to all of the signal management components (2532), and entering the system control apparatus (2000) into the failure condition; and resetting to recover the system control apparatus (2000) from the failure condition.

18. A method for systematic control of (i) extraction of a vehicle (100) from an environment, (ii) stowage of the vehicle in a modular handling and stowage system (1000), the system having a primary module (1102) and zero or more secondary modules (1104a-1104n), wherein the secondary modules are serially, mechanically coupled to the primary module and together, and (iii) deployment of the vehicle from the module group in response to command signals, sensor signals, and status signals, wherein the system comprises a system control apparatus (2000), the system control apparatus comprising:

an operator control unit OCU (2012) operated by a User, wherein the OCU generates the command signals as directed by the User, and receives the sensor signals and the status signals;

a modules supervisory controller (2110), a primary individual motor controller (2112_PM), and a primary module sensor suite (1250_PM), wherein, the modules supervisory controller (2110), the primary individual motor controller, and the primary module sensor suite are included in the primary module, wherein, the primary individual motor controller (2112_PM) is electrically coupled to the modules supervisory controller, and the modules supervisory controller and the primary module sensor suite are electrically coupled to the OCU, and the modules supervisory controller (2110) receives the command signals, the sensor signals and the status signals, the primary individual motor controller (2112_PM) generates one or more of the status signals and receives the command signals, and controls one or more primary actuators, and the primary module sensor suite generates and presents one or more of the sensor signals; and a secondary individual motor controller (2112a-2112-n) and a secondary module sensor suite (1250a-1250n) that are included in each of the zero or more secondary modules, wherein each of the zero or more secondary modules are electrically coupled to the primary individual motor controller (2112_PM), the secondary individual motor controller (2112a-2112-n) generates one or more of the status signals and receives the command signals, and each of the secondary individual motor controllers controls a secondary actuator, and the secondary module sensor suite generates and presents one or more of the sensor signals; wherein, the modules supervisory controller (2110) having a microcontroller that includes status control programming configured as a state machine (4000) to control operation of the primary and the secondary module controllers and the primary and the secondary sensor suites with respect to transition between statuses, the statuses including:

POWER_OFF (4020); ERROR (4052); UNKNOWN (4102); UNKNOWN_CLEAR_TO_STOW (4104); STOWED (4106); STOWED_CLEAR (4108); SOLENOID_ACTIVE (4110); READY_TO_DEPLOY (4120); DEPLOYED (4122); DEPLOYED_CLEAR (4124); READY_TO_STOW (4126); INITIALIZATION (4200); MAIN LOOP (4300); STOWING (4310); DEPLOYING (4350); RECEIVE_VEHICLE (4360);

wherein, the method comprising:

when the state machine (4000) is at the POWER_OFF status (4020) and power is applied, actuating the state machine (4000) and beginning the INITIALIZATION status (4200);

when, conversely, the state machine (4000) is in an active condition and power is removed, the state machine (4000) autonomously transitioning to the POWER_OFF status (4020); and at the INITIALIZATION status (4200), the state machine (4000), in response to the sensor signals, determines the status of all of the primary and/or zero or more secondary modules, when the primary and/or zero or more secondary module is at the UNKNOWN status (4102), the state machine autonomously transitioning to the MAIN_LOOP status (4300), and command-directed transitioning to the STOWED status (4106) in response to a stow command, or to the DEPLOYED status(4122) in response to a deploy command signal.

19. The method of claim 18, wherein, when the state machine (4000) is in the STOWING status (4310) or the DEPLOYING status (4350), the state machine (4000) monitors the sensor signals, and when one or more of the sensor signals exceeds a predetermined limit, the state machine (4000) autonomously transitioning to the ERROR status (4052), and stopping the one or more primary actuators or the secondary actuator.

20. The method of claim 18, wherein, each of the primary and the secondary modules further comprises a solenoid shuttle switching assembly (1530) having the SOLENOID_ACTIVE status (4110) when power is applied to the solenoid shuttle switching assembly (1530), and the transitioning between the statuses further comprising:

when the state machine is in the STOWED state (4106), the state machine command-directed transitions to the SOLENOID_ACTIVE status (4110) in response to a an activate solenoid command signal.

21. The method of claim 19, wherein, when the state machine (4000) is at the STOWED status (4106), when the deploy command is received, the state machine command-directed transitioning to the DEPLOYING status (4350), and autonomously transitioning from the DEPLOYING status (4350) to the DEPLOYED status (4122).

22. The method of claim 19, wherein, when the state machine (4000) is at the DEPLOYED status (4122), when the stow command signal is received, the state machine (4000) command-directed transitioning to the STOWING status (4310), and autonomously transitioning from the DEPLOYING status (4350) to the STOWED status (4106).

* * * * *